(12) United States Patent
Toyoshima

(10) Patent No.: US 8,495,275 B2
(45) Date of Patent: Jul. 23, 2013

(54) LIST STRUCTURE CONTROL CIRCUIT

(75) Inventor: Takashi Toyoshima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 154 days.

(21) Appl. No.: 12/980,884

(22) Filed: Dec. 29, 2010

(65) Prior Publication Data

US 2011/0164459 A1    Jul. 7, 2011

(30) Foreign Application Priority Data

Jan. 7, 2010  (JP) ................................. 2010-002282

(51) Int. Cl.
*G06F 13/00*    (2006.01)
(52) U.S. Cl.
USPC ........... 711/100; 711/154; 711/159; 711/160; 711/167; 711/168; 711/169; 711/170
(58) Field of Classification Search
USPC ................. 711/100, 154, 159, 160, 167, 168, 711/169, 170
See application file for complete search history.

(56) References Cited

U.S. PATENT DOCUMENTS

| | | | | |
|---|---|---|---|---|
| 5,664,155 | A | * | 9/1997 | Elko et al. ...................... 711/170 |
| 5,875,484 | A | * | 2/1999 | Neuhard et al. .............. 711/167 |
| 6,594,667 | B2 | * | 7/2003 | Dahlen et al. ................. 711/100 |
| 2006/0179273 | A1 | | 8/2006 | Cole et al. |

FOREIGN PATENT DOCUMENTS

JP    2008-530689    8/2008

* cited by examiner

*Primary Examiner* — Trong Phan
(74) *Attorney, Agent, or Firm* — Staas & Halsey LLP

(57) ABSTRACT

A list structure control circuit includes memories each individually stores data, selection circuits arranged for each of the memories and series-connect the memories so that data stored in each memory has an order relation, and an update control circuit that adds a position selection signal which specifies a position for data insertion or data removal to a fixed value, or subtracts the position selection signal from the fixed value, generates an enable signal based on the calculation result, and controls data retention performed in the memories or data update performed in the memories using data of a memory in precedent stages based on the generated enable signal, wherein the selection circuits are controlled based on the position selection signal at the time of the data insertion, and data stored in a memory located at the position specified by the position specification signal is updated with data to be inserted.

11 Claims, 28 Drawing Sheets

FIG. 21

|  | RIGHT SIDE | | | |
|---|---|---|---|---|
|  | A | B | C | D |
| LEFT SIDE A |  |  |  |  |
| LEFT SIDE B | < |  |  |  |
| LEFT SIDE C | < | < |  |  |
| LEFT SIDE D | < | > | > |  |

LIST STRUCTURE CONTROL CIRCUIT

CROSS-REFERENCE TO RELATED APPLICATIONS

This application is based upon and claims the benefit of priority of the prior Japanese Patent Application No. 2010-002282, filed on Jan. 7, 2010, the entire contents of which are incorporated herein by reference.

FIELD

An embodiment of the present invention relates to a list structure control circuit.

BACKGROUND

Data expression using a list structure is a basic method in a software processing operation. FIGS. 25 to 28 illustrates diagrams of list structure control. FIG. 25 is a diagram of a one-way link list. FIG. 26 is a diagram of a two-way link list. Structures (or components) E1 to E3 in which data in a memory and link information are combined and are used to manage data for the list structure using software. As illustrated in FIGS. 25 and 26, main bodies of data (DATA) and pointers to next data (NEXT) indicating structures that are link destinations are defined in the structures E1 to E3. In the case of the one-way link list illustrated in FIG. 25, one pointer indicating the address of a subsequent structure is defined in a structure. In the case of the two-way link lists illustrated in FIGS. 26-28, two pointers indicating a subsequent structure (NEXT) and a precedent structure (PREVIOUS), respectively, are defined in a structure.

The list structure is a data structure that is effective in a case where a data sequence, namely, a permutation is meaningful and the insertion and removal of data is repeatedly performed. For example, when inserting data, pointers indicating structures E2 and E3 that are located anterior and posterior to data to be inserted and a pointer indicating structures E4 that corresponds to the data to be inserted are rewritten, as illustrated in FIG. 27. In addition, when removing data, only pointers of the structures E1 and E3 that are linked to the structure E2 to be removed are rewritten. FIG. 28 illustrates a removing operation that uses the link list.

In the link list method, have to be traced N−1 times from the top of a list in order to access the Nth component from the top. Therefore, the link list method takes time to search.

On the other hand, in order to perform similar operation as described above, an array structure can also be used. The array structure is a data structure that is effective in a case where a data sequence (a permutation) is meaningful and neither of the insertion nor the removal of data is performed. Unlike the list structure, the array structure is advantageous that each component can be accessed with one-time reference. Therefore, the array structure is effective when it is necessary to randomly access data. However, when the insertion of data is performed, all pieces of data located posterior to the insert position of data have to be copied one by one. In addition, when the removal of data is performed, all pieces of data located posterior to the remove position of data have to be copied one by one. Therefore, a processing time proportional to the number of components is necessary.

Accordingly, there is a trade-off relationship between the list structure and the array structure depending on the usage thereof. In addition, these structures are the bases of algorithm and a data structure on software, and hence several kinds of list structure processing operations performed on software have been proposed.

An example of documents that disclose a technique relating to link list control is Japanese Unexamined Patent Application Publication (Translation of PCT Application) No. 2008-530689.

In a list control operation that uses software, a large number of structures included in a list have to be rewritten when operating a data insertion operation and a data remove operation. Therefore, to perform these operations repeatedly, a long processing cycle is necessary. In addition, a processing time proportional to the scale of the list is necessary since the list has to be traced from the top thereof when the Nth component from the top of the list is checked.

SUMMARY

According to an embodiment of the present invention, a list structure control circuit includes memory devices configured to individually store data, selection circuits arranged for each of the memory devices, and series-connect the memory devices so that data stored in each memory device has an order relation, and an update control circuit that adds a position selection signal which specifies a position for data insertion or data removal to a fixed value, or subtracts the position selection signal from the fixed value, generates an enable signal based on the calculation result, and controls data retention performed in the memory devices or data update performed in the memory devices using data of the memory devices in precedent stages based on the generated enable signal, wherein the selection circuits are controlled based on the position selection signal at the time of the data insertion, and data stored in a memory device located at the position specified by the position specification signal is updated with data to be inserted.

It is to be understood that both the foregoing general description and the following detailed description are exemplary and explanatory and are not restrictive of the invention, as claimed.

BRIEF DESCRIPTION OF DRAWINGS

FIG. 21 is a diagram of an LRU that uses a priority table as a comparative example;

DETAILED DESCRIPTION OF EMBODIMENT

Hereinafter, an embodiment of the present invention will be described. The invention is not limited to the disclosed embodiment.

In software processing, plural stored data can be linked along with associated pointers into memory via the pointers to form a list structure (linked list). Certain data can be searched for by using the pointers within the list structure. In addition, in some cases, certain data may be deleted from the list structure and/or inserted into the list structure. However, software in which only a list structure is implemented may increase processing time or delay for certain operations on the list structure, such as a search, update, addition and/or deletion of data.

Figure 1:
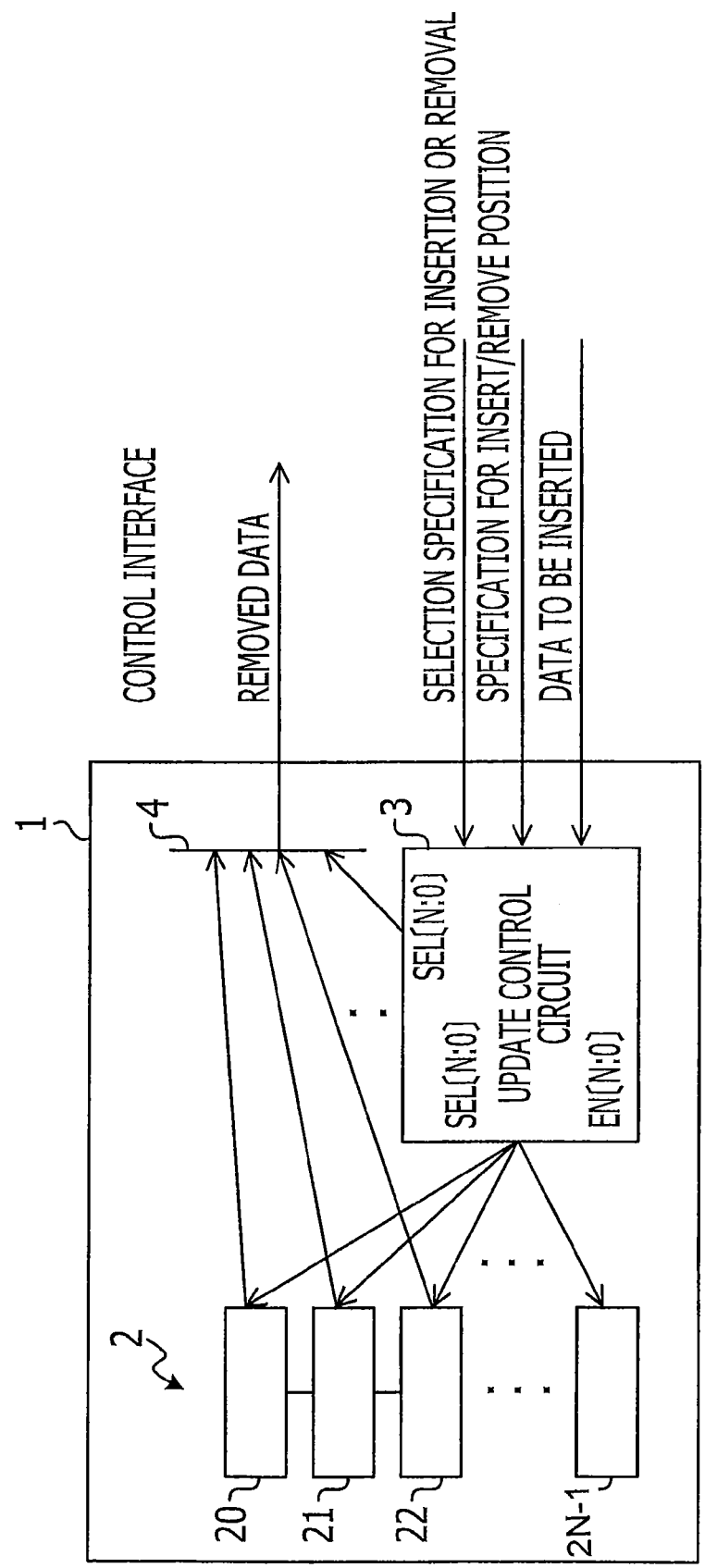
FIG. 1 is a block diagram of a list structure control circuit according to an embodiment of the present invention.

FIG. 1 is a block diagram illustrating a list structure control circuit according to an embodiment of the present invention. FIGS. 2 to 6 are diagrams of a memory device network illustrated in FIG. 1.

A list structure control circuit 1 illustrated in FIG. 1 includes a memory device network 2 that is configured by connecting a plurality of memory elements 20, 21 . . . , 2N in series, an update control circuit 3 that controls, in response to the insertion or the removal of data, whether or not data in each memory element in the memory device network 2 is to be held, or whether or not data held in each memory element in the memory device network 2 is to be updated. The list structure control circuit 1 further includes a selection circuit 4 used for outputting data removed from the memory device network 2 to the outside.

The update control circuit 3 inputs, as control interfaces, one or more specification signal for selecting an operation for the insertion or the removal of data, a specification signal for specifying a position to which inserting data to or removing data from, and data to be inserted. The specification signal for selecting the insertion or the removal of data corresponds to "selection specification for insertion or removal" illustrated in FIG. 1, and will be called "operation selection signal" hereinafter. The specification signal for specifying a position of inserting or removing data is performed corresponds to "specification for insert/remove position" illustrated in FIG. 1, and will be called "operation position" or "position selection signal" hereinafter. The selection circuit 4 notifies the external component of data removed from the memory device network 2. By externally notifying of removed data, the list structure control circuit 1 can be used not only for just removing data, but also used for a case in which retrieving data to be removed from an arbitrary position and to be used by the external component.

In order to hold data that has an order relation each other, the memory device network 2 includes a sequential circuit in which a plurality of memory elements 20, 21, . . . , 2N (N memory elements) are connected through a network. The memory device network 2 one data insert operation or one data remove operation is performed in a single clock cycle. The update control circuit 3 includes an addition and subtraction circuit. The update control circuit 3 generates an enable signal EN [N−1:0] (EN[0] to EN[N−1]) for each of the memory elements 20, 21, . . . , 2N based on an operation position SEL [N−1:0] externally inputted, and outputs the operation selection signal to the selection circuit 4, and outputs the operation position SEL [N−1:0] and the enable signal EN [N−1:0] to the memory elements 20, 21, . . . , 2N. In addition, for example, when the operation selection signal indicates an insert instruction, the update control circuit 3 outputs insert data, and updates each memory element or the like. In such a way, the update control circuit 3 controls the insertion of data and the removal of data.

The memory device network 2 illustrated in FIG. 1 will be described. In a hardware processing operation, it is difficult to change handling of a dynamically ensured memory space, namely, configuration of the memory space thereof. Therefore, it is difficult to implement the list for software as illustrated in FIGS. 25 to 28 into a hardware as it is. In the embodiment, using the parallelism of hardware, a list processing is operated using an array structure expressed by software.

Figure 2:
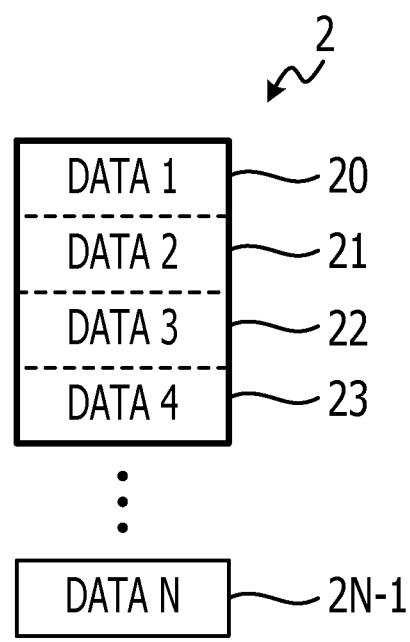
FIG. 2 is a diagram of a memory device network.

The memory device network 2 illustrated in FIG. 2 has memory elements 20 to 2N−1 arranged to individually store a piece of data 1 to data N in order. When it is intended to insert data 1.5 into a certain position, the position of data 2 in this case as illustrated in FIG. 3, each piece of data located posterior to the insert position of the data 1.5, a memory element 21 in which the data 2 is stored, is relocated to an immediately posterior memory element, and the data 1.5 is written into a memory element that has become vacant owing to the relocation.

In software processing, it is necessary to execute a sequence of relocation processing to ensure a vacant space for inserting data in units of data components. Therefore, a processing time proportional to the number of components is required for an insertion of data. In other words, while a list structure is used in the software processing to reduce the processing cost (in other words, processing time) of the relocation process, the relocation process can be simultaneously executed for all components in hardware. Hence, the processing time of the relocation is even further reduced.

Figure 3:
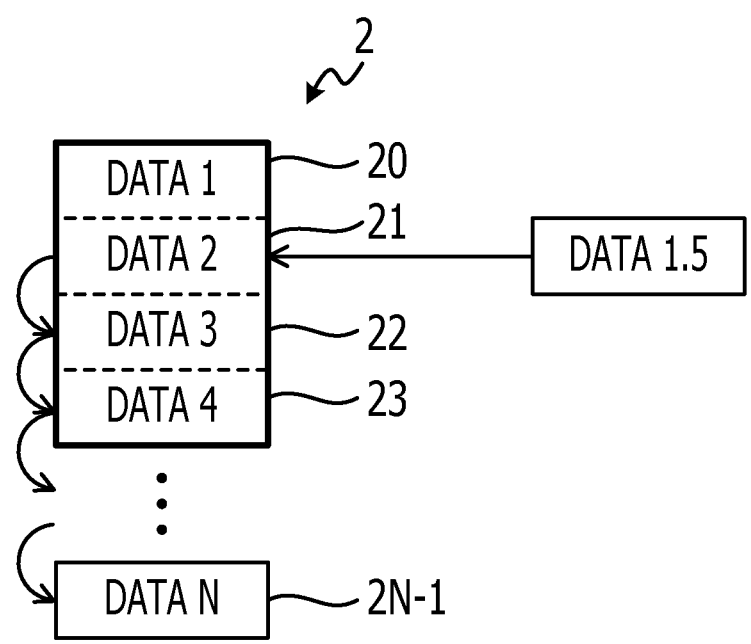
FIG. 3 is a diagram of an insert operation.
Figure 4:
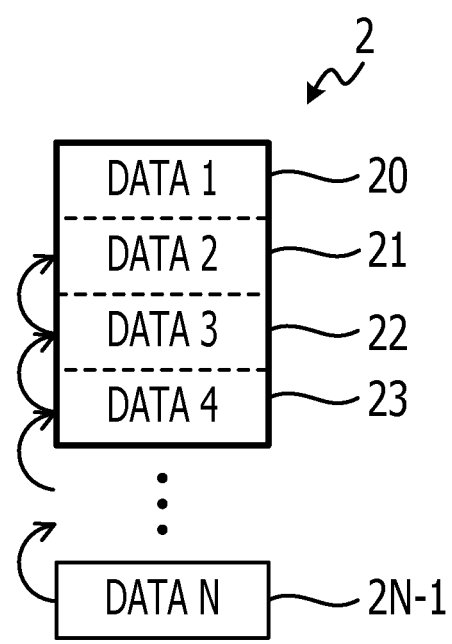
FIG. 4 is a diagram of a remove operation.
Figure 5:
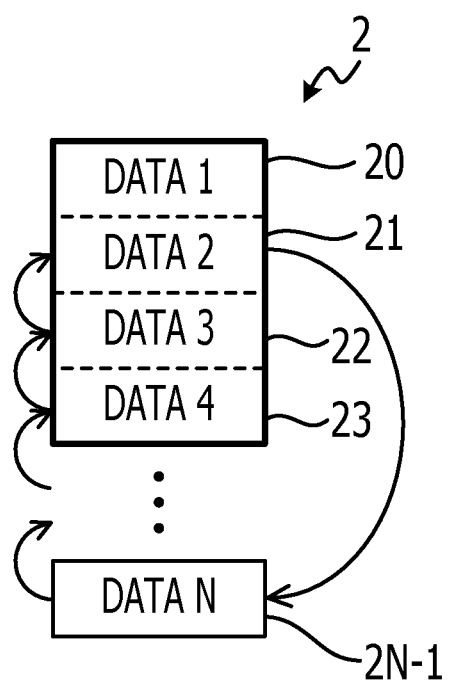
FIG. 5 is a diagram of an insert operation and a removal operation.

Similar to the operation illustrated in FIG. 3, the relocation process can be executed for individual components in parallel when executing a component remove operation, as illustrated in FIG. 4. For example, when data 2 is removed, each piece of data located posterior to the remove position, data 2, is relocated to an immediately anterior memory element. In addition, when the memory device network 2 forms an least recently used (LRU) circuit as illustrated in FIG. 5, the removed data 2 is relocated to the final position of the memory device network 2, and each of data located posterior to the position of the data 2 is relocated to an immediately anterior memory element.

The list structure in the hardware is implemented using the array structure. This means that the Nth component in the permutation can also be referred to without tracing links from the top of the list structure.

In such hardware structure as described above, some conditions can be assumed. For example, data 3 can be relocated to the area of data 4 by inserting a component of data into the position of data 2, inserting the component into the position of data 3, inserting the component into the position of data 4, and the like. If the number of components included in the memory device network increases, the number of conditions for the data insertion/removal increases in proportion to the number of components. With respect to hardware, an increase in the number of components means that the number of stages in a logical circuit increases, and that the amount of time required for performing a process in one cycle increases, in other words, the operating frequency decreases.

Circuit latency that occurs based on the relocation of data associated with the insertion and removal of data increases in proportion to the number of the components of the memory device network 2. In order to reduce the circuit latency and minimize the size of a circuit, the update control circuit 3 operates the update control for the list structure by using an Adder or a Subtractor. Accordingly, a large-sized list structure can be implemented at high speed and at low cost.

Figure 6:
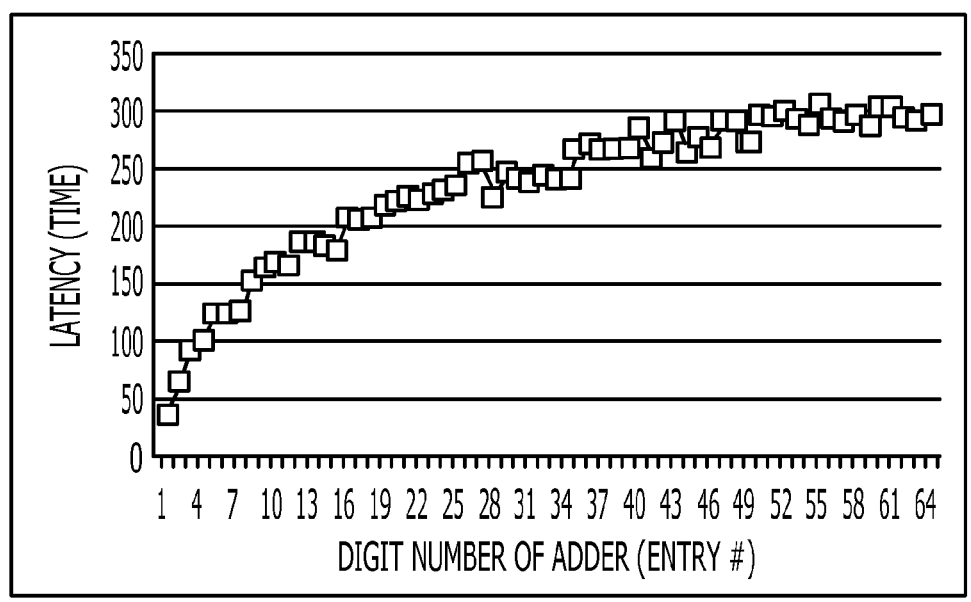
FIG. 6 is a diagram of a latency time occurring when an update control circuit has an Adder configuration.

For example, it is desirable to use a carry save Adder/carry select Adder (CSA) as the update control circuit 3. For a large-sized addition and subtraction operation, the CSA can also perform an operation at high speed by optimizing the circuit. FIG. 6 is a diagram illustrating a relationship between the number of digits in an addition and subtraction operation (Digit Number of Adder (Entry #)) and the latency (Latency (Time)) of a circuit. The number of entries of data corresponds to the number of digits in an addition and subtraction operation (Digit Number of Adder (Entry #)). Even if the number of entries increases, the logic does not get more complex. FIG. 6 illustrates the latency of a logic-synthesized circuit. The latency saturates with an increase in the number of entries. Therefore, even if the number of entries of data increases, the size of a circuit can be minimized.

Figure 7:
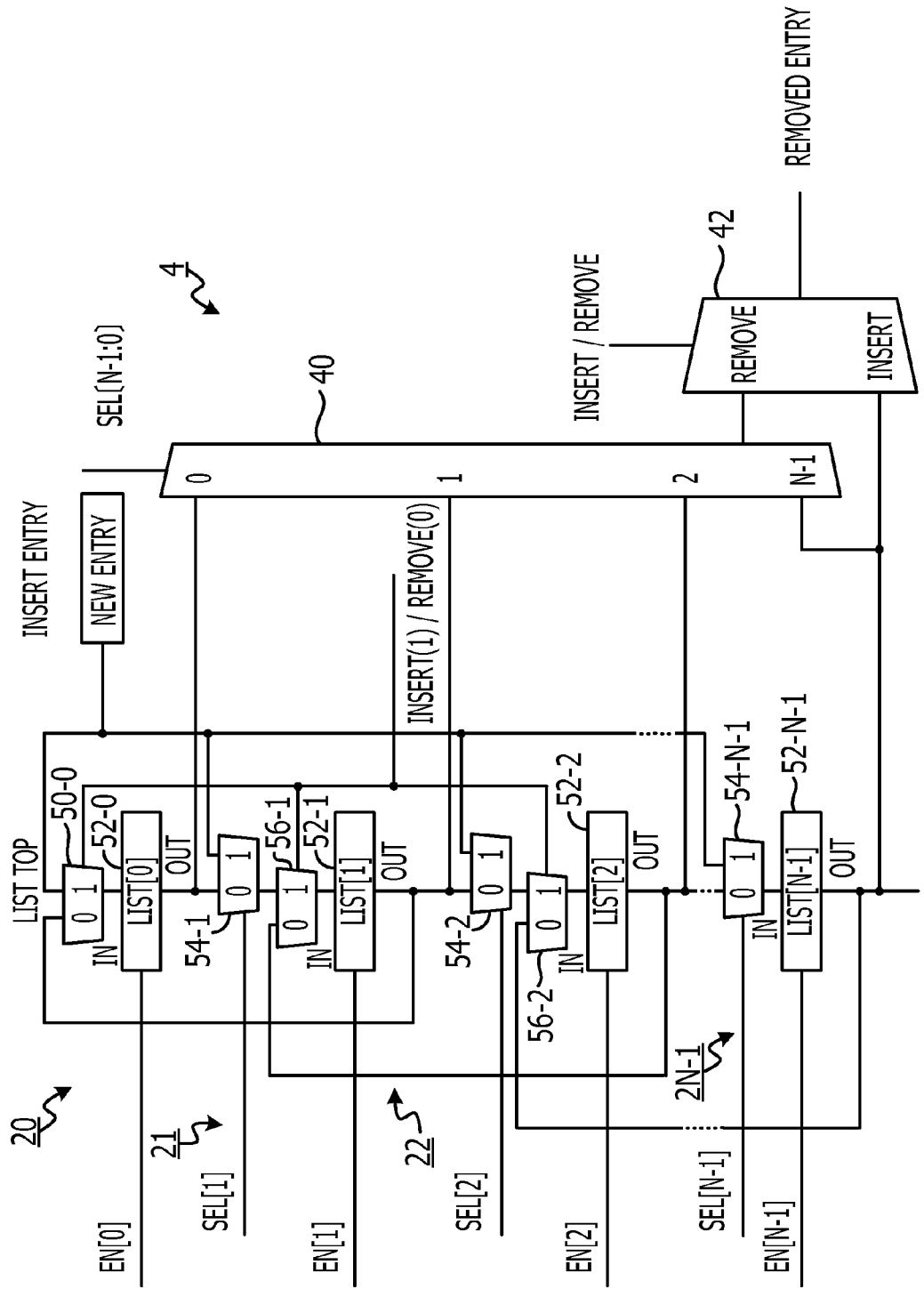
FIG. 7 is a circuit diagram of the memory device network.
Figure 8:
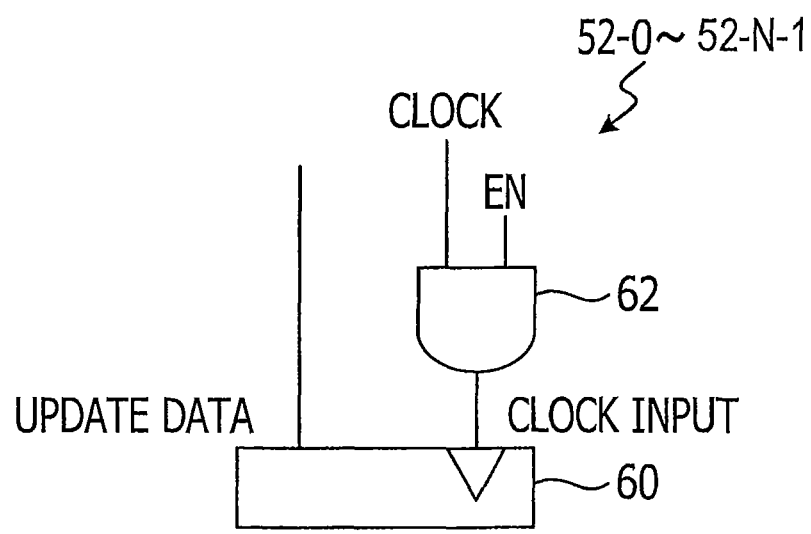
FIG. 8 is a circuit diagram of a memory element.
Figure 9:
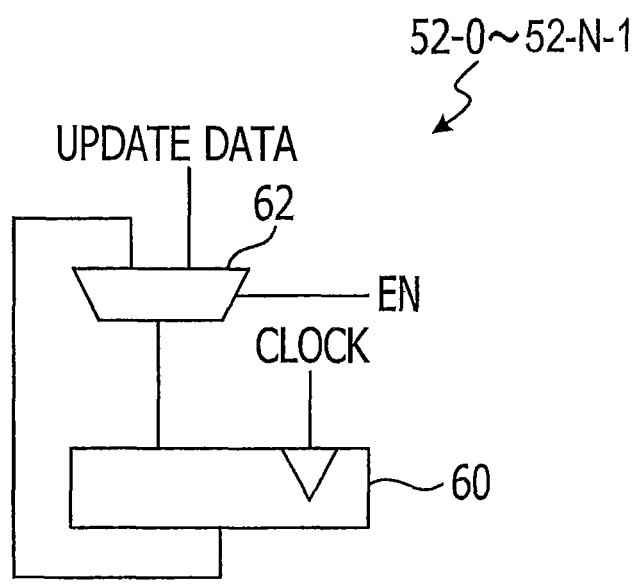
FIG. 9 is a circuit diagram of a memory element.

FIG. 7 illustrates circuit diagrams of the memory device network and the selection circuit illustrated in FIG. 1. FIG. 8 illustrates an example of the circuit diagram of a memory element illustrated in FIG. 7. FIG. 9 illustrates another example of the circuit diagram of the memory element illustrated in FIG. 7.

The memory device network 2 illustrated in FIG. 7 is a sequential circuit including N memory elements 20 to 2N−1 that are connected in series. The memory element 20 is the leading stage (top of the list—LIST TOP) of the memory device network 2, and the memory element 2N−1 is the final stage (LIST[N−1]) of the memory device network 2. The memory elements 21 to 2N−2 located between the leading stage and the final stage are the intermediate stages (LIST[0], LIST[1] and LIST[2]) of the memory device network 2.

FIG. 7 illustrates an example in which the number of entries of the memory device network 2 is N. In FIG. 7, "insert/remove" is defined as a signal for specifying a selection of insertion of data and removal of data. SEL [N−1:0] is defined as a signal for specifying a position for inserting data or removing data. However, the selection signal SEL [0] for the leading stage is not necessary for circuit control, and hence the selection signal SEL [0] is not illustrated in FIG. 7. An assertion of enable signals EN[0] to EN[N−1] is controlled by the update control circuit 3, and data stored in a memory element corresponds to the asserted enable signal EN is updated.

The memory element 20 includes a first multiplexer 50-0 and a memory device 52-0 that receives data (IN) output from the first multiplexer 50-0. The first multiplexer 50-0 selects and outputs either one of an insert entry (data) (NEW ENTRY) and the output (OUT) of a memory device 52-1 in a subsequent stage in response to a value of the insert/remove signal "insert/remove". The insert/remove signal instructs insertion of data when its value is "1", and instructs removal of data when the value is "0" (INSERT(1)/REMOVE(0)). The first multiplexer 50-0 selects and outputs an insert entry to (IN) the memory device 52-0 when the insertion is instructed. On the other hand, the first multiplexer 50-0 selects and outputs the output (OUT) of the memory device 52-1 in the subsequent stage to the memory device 52-0 when the removal is instructed.

A memory element 21 includes a second multiplexer 54-1, a third multiplexer 56-1, and a memory device 52-1 that receives (IN) the output of the third multiplexer 56-1.

The second multiplexer 54-1 selects either one of the output (OUT) of the memory device 52-0 and an insert entry in response to a selection signal SEL [1]. When the selection signal SEL [1] is "1", which indicates "selection", the second multiplexer 54-1 selects and outputs the insert entry to the third multiplexer 56-1. On the other hand, when the selection signal SEL [1] is "0", which indicates "non-selection", the second multiplexer 54-1 selects and outputs the output (OUT) of the memory device 52-0 to the third multiplexer 56-1.

The third multiplexer 56-1 selects one of the output of the second multiplexer 54-1 and the output (OUT) of a memory device 52-2 in a subsequent stage in response to the value of the insert/remove signal "insert/remove".

The third multiplexer 56-1 selects and outputs the output of the second multiplexer 54-1 to (IN) the memory device 52-1 in response to an insert instruction. On the other hand, the third multiplexer 56-1 selects and outputs the output (OUT) of the memory device 52-2 in the subsequent stage to (IN) the memory device 52-1 in response to a remove instruction.

A memory element 22 includes a second multiplexer 54-2, a third multiplexer 56-2, and a memory device 52-2 that receives the output of the third multiplexer 56-2. Hereinafter, memory elements 23 to 2N−2 have similar configurations as described above. In addition, memory elements 22 to 2N−2 perform the same operations as that performed in the memory element 21.

A memory element 2N−1 includes a second multiplexer 54-N−1 and a memory device 52-N−1 that receives (IN) the output of the second multiplexer 54-N−1. The second multiplexer 54-N−1 selects either one of the output (OUT) of the memory device 52-N−2 and an insert entry in response to the value of a selection signal SEL [N−1]. When the selection signal SEL [N−1] is "1", the second multiplexer 54-N−1 selects and outputs the insert entry to (IN) the memory device 52-N−1. On the other hand, when the selection signal SEL [N−1] is "0", the second multiplexer 56-N−1 selects and outputs the output (OUT) of the memory device 52-N−2 in a precedent stage to (IN) the memory device 52-N−1.

Each of the memory devices 52-0 to 52-N−1 has a data input terminal (IN) and an input terminal for inputting an enable control signal. Each memory device 52-0 to 52-N−1 is only updated with input data when a corresponding enable signal EN is asserted. When the enable signal EN is not asserted, the memory devices 52-0 to 52-N−1 hold current values. In addition, the output (OUT) of each memory device is supplied to a multiplexer 40.

FIG. 8 is a circuit diagram of a first embodiment of each of the memory devices 52-0 to 52-N−1, which uses a clock gating technique. In FIG. 8, each of the memory devices 52-0 to 52-N−1 includes a memory 60 that stores update data in response to inputted clock and an AND circuit 62 that performs logical product of the enable signal EN and a clock. For example, the memory 60 includes a flip-flop (FF) circuit. The clock is input to the memory 60 at a time when the enable signal EN is asserted, and a value held in the memory 60 is updated with update data based on the clock input.

FIG. 9 illustrates another example of circuit diagram each of the memory devices 52-0 to 52-N−1, which uses a multiplexer. In FIG. 9, each of the memory devices 52-0 to 52-N−1 includes a memory 60 that stores update data in response to a clock input and a multiplexer 64 that selects either one of input update data and the data of the memory 60 in response to the enable signal EN as a selection signal. For example, the memory 60 includes a flip-flop circuit.

The memory 60 feedbacks data to multiplexer 64, and selects to update data with data output from the memory 60 itself, or with input update data based on the selection signal EN. In FIG. 9, when the enable signal EN is asserted, the update data is selected, and in other cases, data in the memory 60 is updated with a value feedbacked from the memory 60 itself, namely, the data in the memory 60 is held.

Returning to FIG. 7, the selection circuit 4 includes a multiplexer 40 that receives the outputs (OUT) of each of the memory elements 52-0 to 52-N−1 and a selector 42. The multiplexer 40 selects the output (OUT) of a memory element specified by the position selection signal SEL [N−1:0]. The selector 42 receives the output of the multiplexer 40 and the output (OUT) of the memory element 52-N−1 in the final stage. In addition, the selector 42 selects and outputs (REMOVED ENTRY) the output of the multiplexer 40 when "remove" is ordered by the input (INSERT/REMOVE), and selects and outputs (REMOVED ENTRY) the output (OUT) of the memory element 52-N−1 in the final stage when "insert" is ordered by the input (INSERT/REMOVE).

Figure 10:
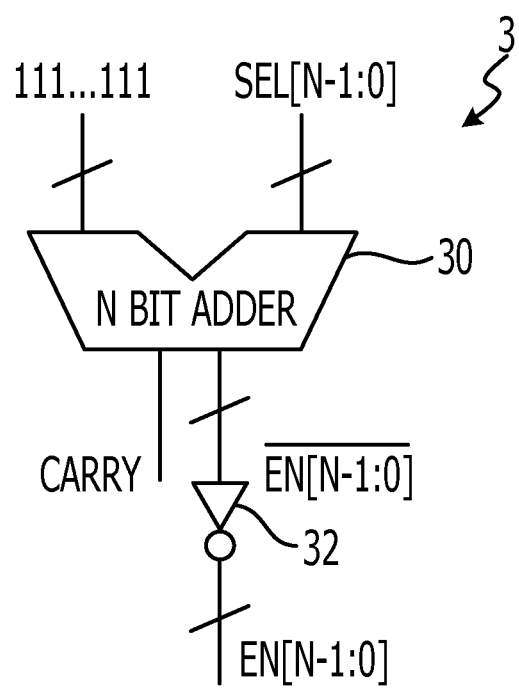
FIG. 10 is a diagram of an update control circuit.
Figure 11:
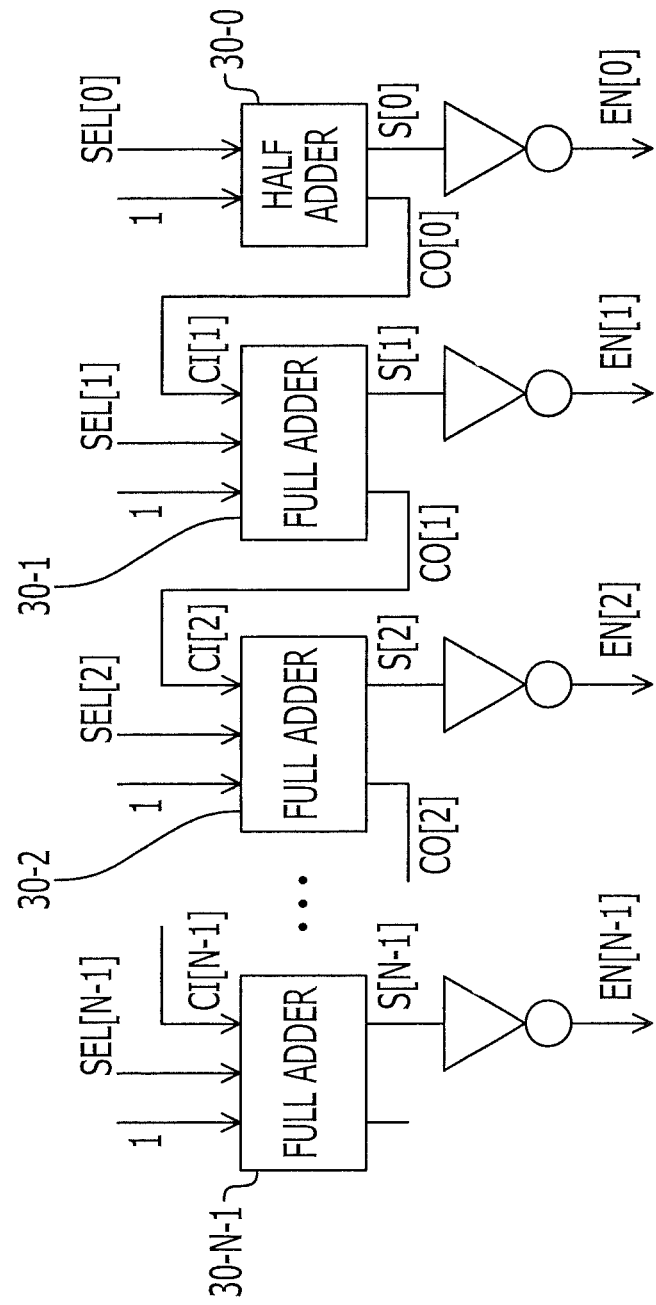
FIG. 11 is a circuit diagram of the update control circuit.
Figure 12:
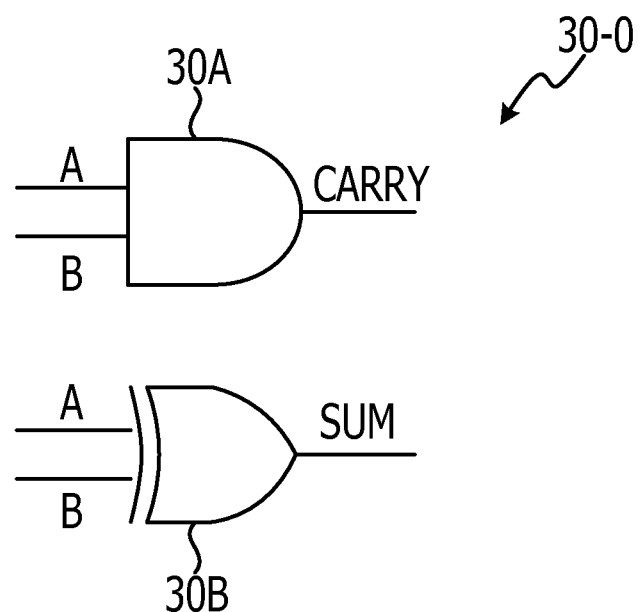
FIG. 12 is a circuit diagram of a half Adder.
Figure 13:
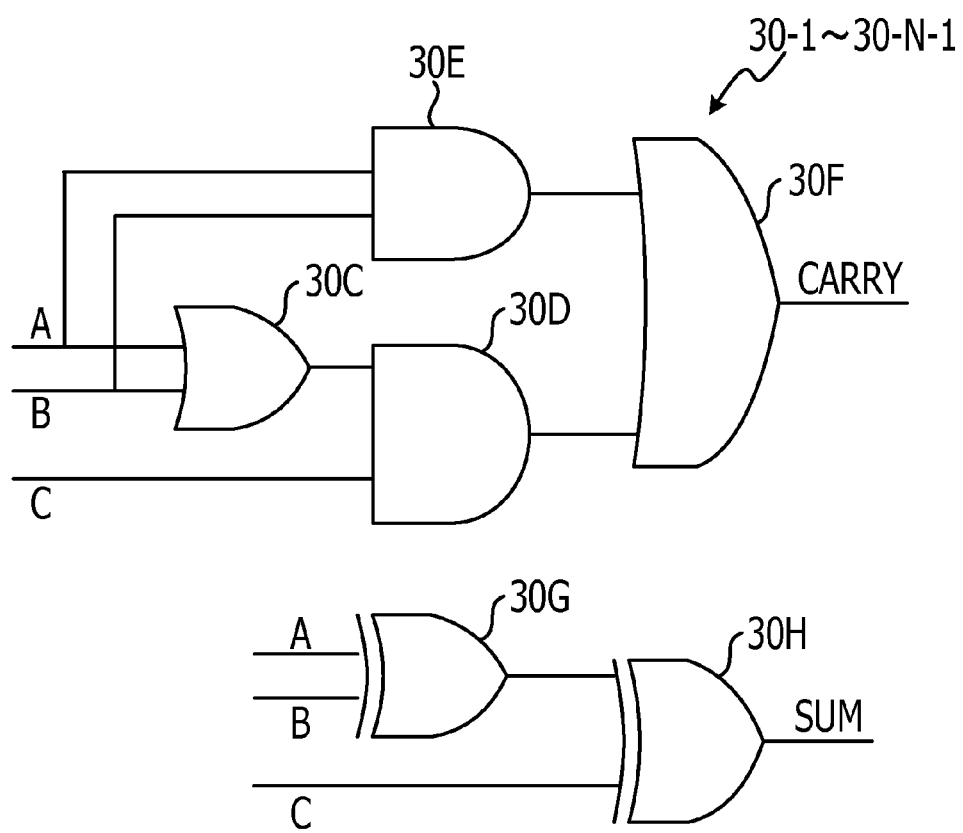
FIG. 13 is a circuit diagram of a full Adder.
Figure 14:
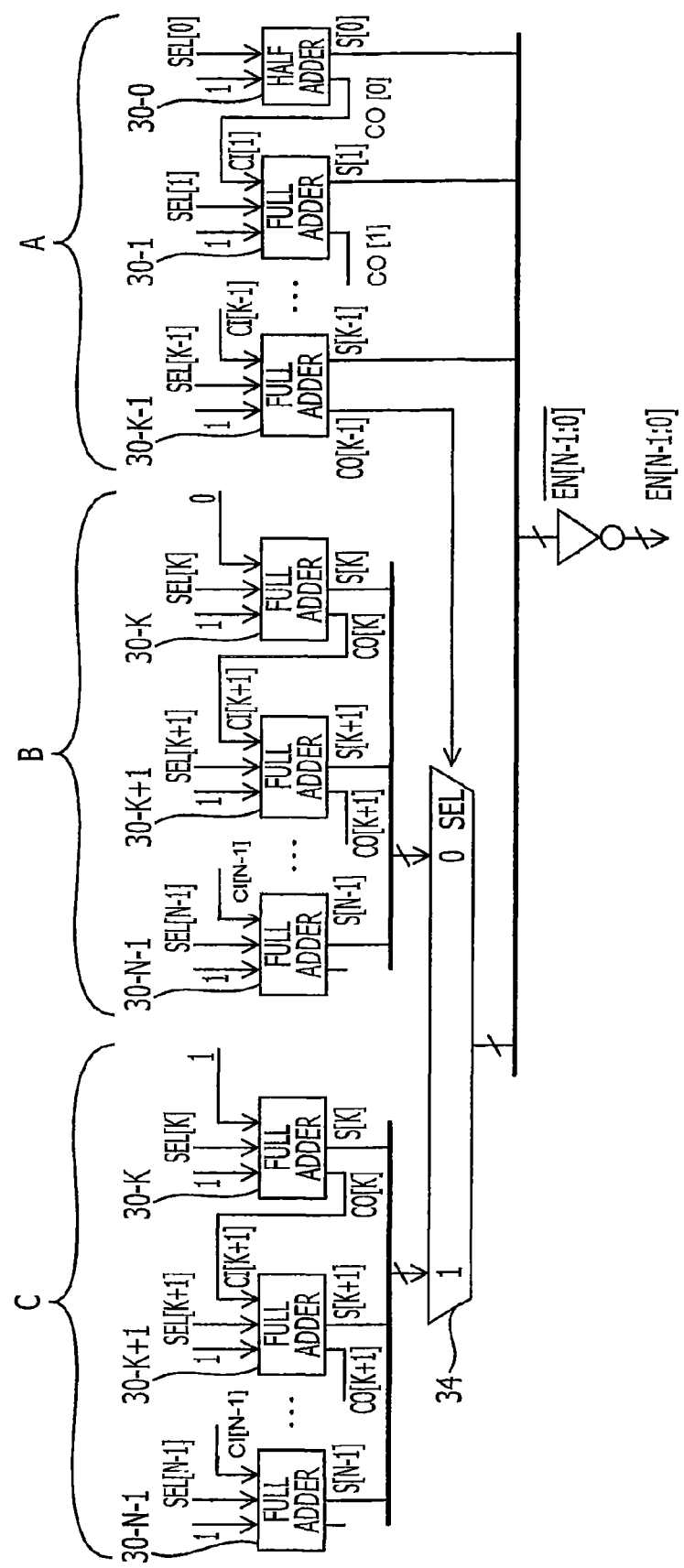
FIG. 14 is a circuit diagram of an example in which the circuit illustrated in FIG. 11 is configured using a Carry Select Adder.

FIG. 10 illustrates a diagram of an example of the update control circuit illustrated in FIG. 1. FIG. 11 illustrates a circuit diagram of the update control circuit illustrated in FIG. 10. FIG. 12 illustrates a circuit diagram of a half Adder illustrated in FIG. 11. FIG. 13 illustrates a circuit diagram of a full Adder illustrated in FIG. 11. FIG. 14 illustrates a circuit diagram of an example in which a CSA circuit illustrated in FIG. 11 is optimized.

The update control circuit 3 illustrated in FIG. 10 includes an N-bit Adder 30 that adds an N-bit position selection signal SEL [N−1:0] to a fixed value, for example, N bits of "1" ("111, . . . , 111"), and an inverting circuit 32 that inverts an output EN[N−1:0] (overbar is an operator indicating logical negation) of the N-bit Adder 30 and outputs the N-bit enable signal EN [N−1:0].

The update control circuit 3 generates the enable signal EN in accordance with the following rule. First, when a position selection signal SEL [k], where k is an index variable which value ranges from 0 to N−1, that indicates a position k is "1", a position selection signal SEL [I] that indicates another position is "0", where I is not equal to k. In an enable signal generated from the position selection signal SEL, the enable signal EN [m] of the memory element $2m=0$ (m<k), and the enable signal EN [n] of another memory element=1 (n≧k).

In order to generate the enable signal EN that satisfies the condition mentioned above, the update control circuit 3 evaluates the following expression including addition.

$$\overline{EN[N-1:0]} = (2^N - 1) + SEL[N-1:0]$$

With respect to N entries, the position selection signal SEL [N−1:0] is added to an N-bit fixed value $(2^N-1)$, which all bits are "1", and the addition result is logically inverted regardless of the carry of the most significant digit (Carry). For example, in a case in which a value is expressed with 4 bits, the following result is obtained.

```
      1 1 1 1
+ )   0 0 1 0
    ─────────
    1 0 0 0 1
```

In this way, 5 bits '10001' is obtained as the result of 4 bits '1111'+SEL[3:0], (4 bits '0010'). EN [3:0]=4 bits '1110' is obtained by inverting the logical value of the addition result regardless of the carry bit of the most significant digit.

An example of the CSA circuit will be described with reference to FIGS. 11 to 13. The update control circuit 3 illustrated in FIG. 11 includes a half Adder 30-0 to which the position selection signal SEL [0] is input, and full Adders 30-1 to 30-N−1 to which carry outputs CO [0] to CO [N−1] of Adders in precedent stages and the position selection signals SEL [1] to SEL [N−1] are input, respectively. A value "1" is input to each of the half Adder 30-0 and the full Adders 30-1 to 30-N−1. The circuit illustrated in FIG. 11 is called a Ripple Carry Adder.

The half Adder 30-0 illustrated in FIG. 12 includes an AND circuit 30A that performs logical product of inputs A and B and outputs a carry, and an EOR circuit 30B that performs an Exclusive OR (EOR) of the inputs A and B and outputs the sum (SUM) thereof. In the example illustrated in FIG. 11, A equals to either one of "1" and SEL [0], and B equals to the other of "1" and SEL [0]. In the example illustrated in FIG. 11, CARRY=CO [0], and SUM=S [0].

As illustrated in FIG. 13, each of the full Adders 30-1 to 30-N−1 includes an AND circuit 30E that performs a logical product of inputs A and B, an OR circuit 30C that performs a logical addition of the input A to the input B, an AND circuit 30D that performs a logical product of the output of the OR circuit 30C and an input C, and an AND circuit 30F that performs a logical product of the outputs of the AND circuits 30E and 30D and outputs a carry.

Each of the full Adders 30-1 to 30-N−1 includes an EOR circuit 30G that performs the operation of EOR of the inputs A and B, and an EOR circuit 30H that performs the operation of EOR of the output of the OR circuit 30G and the input C and outputs the sum (SUM) thereof.

In FIGS. 12 and 13, the inputs A and B correspond to the position selection signal SEL in FIG. 11 which value is "1", respectively. In FIG. 13, the input C corresponds to the carry in FIG. 11. Owing to a CSA configuration as described above, and enable signals for a plurality of entries can be generated with minimized circuit latency.

FIG. 14 illustrates an example in which the CSA circuit in FIG. 11 is modified in view of a latency time. In FIG. 14, the same symbol is assigned to the same portion as that in FIG. 11. In FIG. 14, the CSA circuit is separated into a group A that includes position selection signals SEL [0] to SEL [k−1] and groups B and C that include position selection signals SEL [k] to SEL [N−1]. The group B corresponds to a case in which the carry is "0", and the group C corresponds to a case in which the carry is "1".

The group A includes a half Adder 30-0 to which the position selection signal SEL [0] is input, and full Adders 30-1 to 30-K−1 that receives carry outputs CO[0] to CO[K−2] of Adders in precedent stages and the position selection signals SEL [1] to SEL [K−1], respectively. A value "1" is input to each of the half Adder 30-0 and the full Adders 30-1 to 30-K−1. The groups B and C each include a full Adder 30-K to which the position selection signal SEL[K] is input, and full Adders 30-K+1 to 30-N−1 that receives carry outputs CO[K] to CO [N−2] of Adders in precedent stages and the position selection signals SEL[K+1] to SEL [N−1], respectively.

The groups B and C include full Adders 30-K to 30-N−1 that receives carry outputs of Adders in precedent stages and the position selection signals SEL [K] to SEL [N−1], respectively. However, "0" is input as a carry input to the full Adder 30-K in the leading stage of the group B, and "1" is input as a carry input to the full Adder 30-K in the leading stage of the group C.

In FIG. 14, a multiplexer 34 that selects the outputs of the groups B and C in response to the carry CO[K−1] of the full Adder 30-K−1 in the final stage of the group A is provided. In such a configuration addition operation in which the carry CO [K−1] of the full Adder 30-K−1 in the final stage of the group A is "0" and an addition operation in which the carry CO [K−1] of the full Adder 30-K−1 in the final stage of the group A is "1" are performed in the groups B and C in parallel, respectively. Therefore, an enable signal EN (EN[N−1:0] (overbar is an operator indicating logical negation)) can be generated before a carry output propagates to the full Adder 30-N−1. Therefore, a carry propagation distance is reduced to half, and a circuit latency time can be reduced. The CSA circuit is called a Carry Select Adder.

Figure 15:
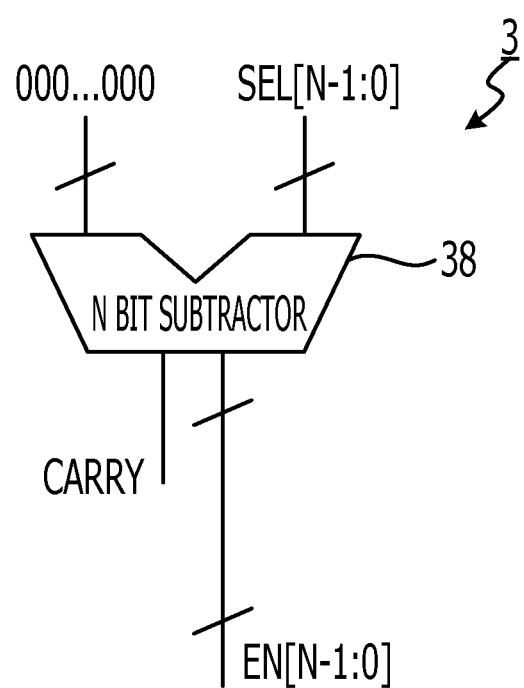
FIG. 15 is a diagram of an update control circuit.
Figure 16:
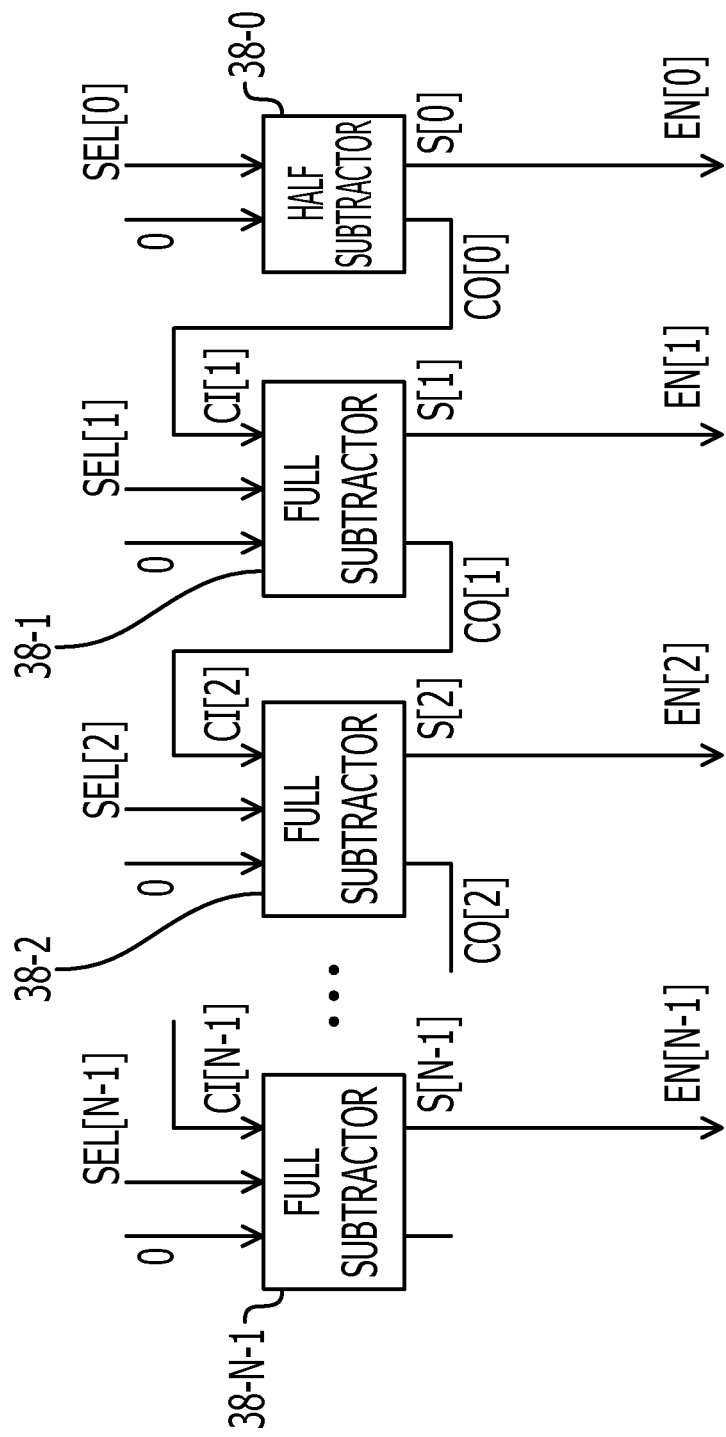
FIG. 16 is a circuit diagram of the update control circuit.

FIG. 15 illustrates a diagram of another example of the update control circuit illustrated in FIG. 1. FIG. 16 illustrates a circuit diagram of the update control circuit illustrated in FIG. 15. FIG. 15 is an example in which the CSA is configured by using a Subtractor. As illustrated in FIG. 15, the update control circuit 3 includes an N-bit Subtractor 38 that adds the N-bit position selection signal SEL [N−1:0] to N bits of "0" ("000, . . . , 000").

The update control circuit 3 illustrated in FIG. 15 generates the enable signal EN in accordance with the following rule. Similar to FIG. 11, when a position selection signal SEL [k] that indicates a position k is "1", a position selection signal SEL [l] that indicates another position is "0" (l!=k). In an enable signal generated from the position selection signal, the enable signal EN [m] of the memory element $2m=0$ (m<k), and the enable signal EN [n] of another memory element=1 (n≧k).

In order to generate the enable signal EN that satisfies the condition, using subtraction, the update control circuit 3 evaluates the following expression including subtraction.

$$EN[N-1:0]=2^N-SEL[N-1:0]$$

With respect to N entries, the position selection signal SEL is subtracted from an N-bit fixed value (2N) in which all bits are "0", and the Carry of the most significant digit is ignored. For example, in a case in which a value is expressed with 4 bits, the following subtraction result is obtained.

```
    1 0 0 0 0
−)    0 0 1 0
    ─────────
      1 1 1 0
```

An example of the CSA circuit will be described with reference to FIG. 16. The update control circuit 3 includes a half Subtractor 38-0 to which the position selection signal SEL[0] is input and full Subtractors 38-1 to 38-N−1 to which carry outputs CO[0] to CO[N−2] of Subtractors in precedent stages are input as CI[1] to CI[N−1], respectively, and the position selection signals SEL [1] to SEL [N−1] are also input. A value "0" is input to each of the half Subtractor 38-0 and the full Subtractors 38-1 to 38-N−1. In the example illustrated in FIG. 16, CARRY=CO[0], CO[1], CO[2], and SUBTRACT=S[0], S[1], S[2], S[N−1].

Since the inverting circuit in FIG. 11 can be eliminated in the Subtractor as illustrated in FIG. 16, the circuit size thereof can be reduced and the operating frequency thereof can be improved.

Figure 17:
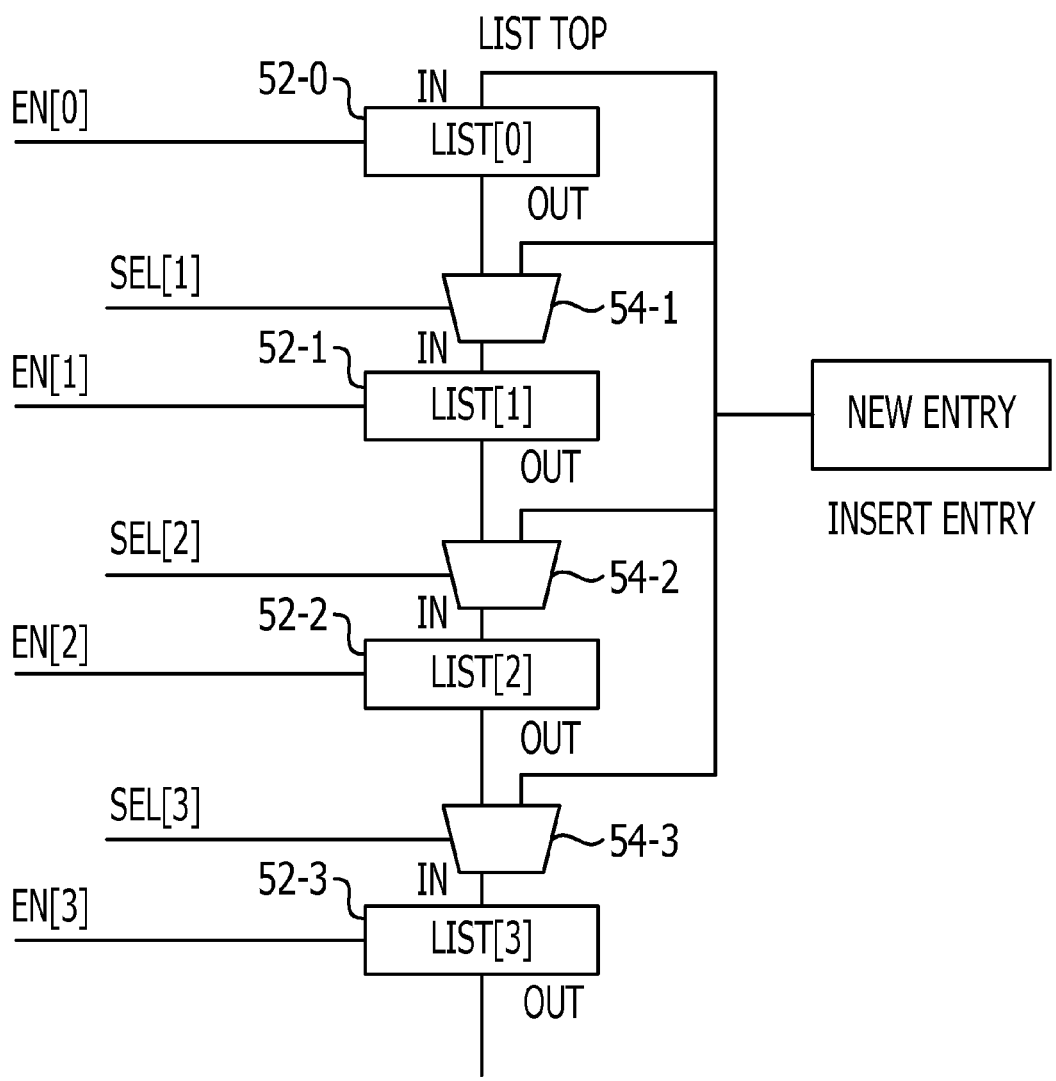
FIG. 17 is a diagram of an insert operation.
Figure 18:
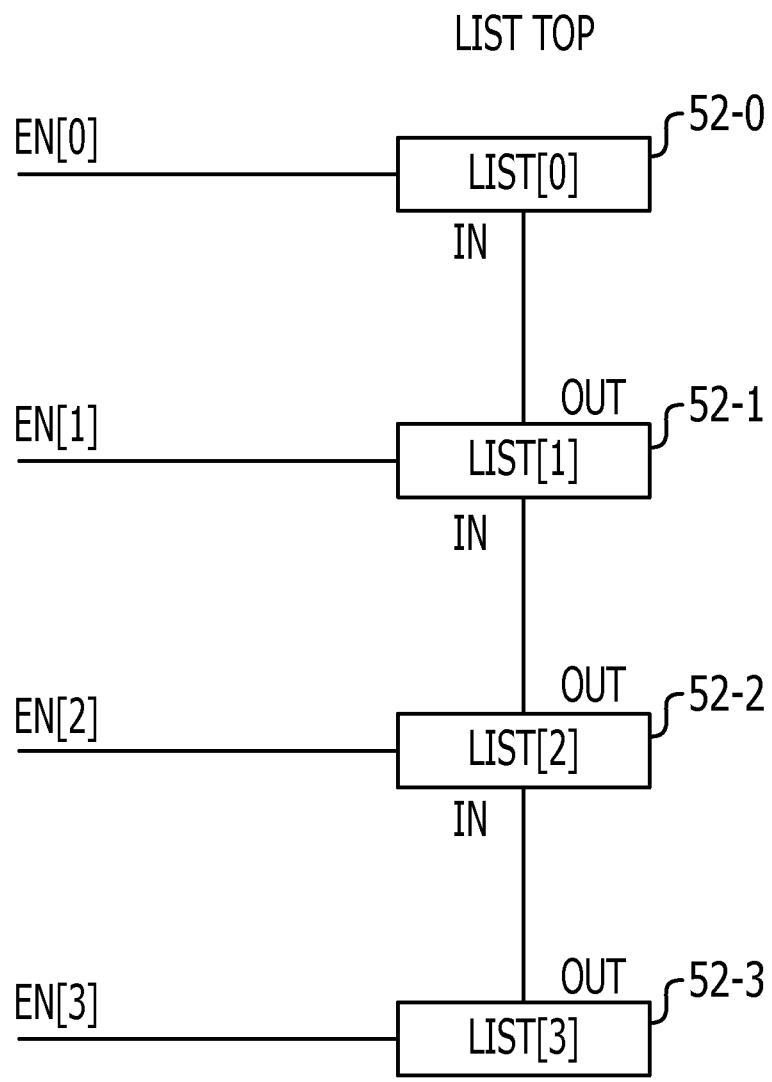
FIG. 18 is a diagram of a remove operation.

The operation of the list structure control circuit will be described. FIG. 17 illustrates an insert operation (NEW ENTRY) performed in the list structure control circuit illustrated in FIGS. 1 to 16. FIG. 18 illustrates a remove operation performed in the list structure control circuit illustrated in FIGS. 1 to 16. FIG. 17 illustrates only a portion which relates to the insert operation (NEW ENTRY), and FIG. 18 illustrates only a portion which relates to the remove operation. In FIGS. 17-18, the same symbol is assigned to the same portion as that in FIG. 7. In order to reduce the description thereof, in FIGS. 17 and 18, the configuration of a 4-stage memory element will be described that corresponds to the case of N=4.

The circuit configuration in FIG. 17 or in FIG. 18 becomes active depending on a value of the "insert/remove" signal, "0" (remove) or "1" (insert) in FIG. 7. In this example, when the "insert/remove" signal is "1", components of the circuit in FIG. 17 are validated, and when the "insert/remove" signal is "0", components of the circuit in FIG. 18 are validated.

When the "insert/remove" signal to be input is "1", multiplexers 50-0, 56-1, 56-2, . . . select insert entries as illustrated in FIG. 7. Therefore, as illustrated in FIG. 17, memory elements 52-0 to 52-3 are sequentially connected through multiplexers 54-1, 54-2, and 54-3.

In FIG. 17, components of the memory device network that operates at the time of data insertion are extracted and illustrated. When data i inserted, data held in memory elements in subsequent stages are not selected as objects to be input to memory elements. Accordingly, the multiplexer 50-0 illustrated in FIG. 7 only operates selection of an insert entry when data insertion is necessary, and the multiplexers 56-1, 56-2 . . . selects only selecting data output from memory elements in precedent stages. At the time of data insertion, it may be assumed that the multiplexers 50-0, 56-1, 56-2 . . . do not practically select data. Accordingly, in the circuit illustrated in FIG. 17, components that correspond to the multiplexers 50-0, 56-1, 56-2 . . . are not illustrated.

When being selected by the position selection signals SEL, the multiplexers 54-1, 54-2, and 54-3 provided on the input sides of the memory elements 52-1 to 52-3 select insert entries input from the right side of FIG. 17. In addition, when not being selected by the position selection signals SEL, the multiplexers 54-1, 54-2, and 54-3 select data of memory elements in precedent stages, input from the left side of FIG. 17.

For example, when data is inserted into the zeroth memory element 52-0, the update control circuit 3 generates a position selection signal SEL [3:0]=4 bits '0001' and an enable signal EN [3:0]=4 bits '1111', and outputs position selection signals SEL [1]=0, SEL [2]=0, and SEL [3]=0 and enable signals EN [0]=1, EN [1]=1, EN [2]=1, and EN [3]=1.

As a result, the memory element 52-0 is updated with an insert entry, and other memory elements 52-1 to 52-3 are updated with data of the memory elements 52-0 to 52-2 in precedent stages, respectively. Data is newly inserted into the top of data. Trailing data is removed from the entry as if being extruded. Data to be removed may be output as removed data to be defined as the output of a control interface.

Similarly, when data is inserted into the first memory element 52-1, the update control circuit 3 generates the position selection signal SEL [3:0]=4 bits '0010' and the enable signal EN [3:0]=4 bits '1110', and outputs position selection signals SEL [1]=1, SEL [2]=0, and SEL [3]=0 and enable signals EN [0]=0, EN [1]=1, EN [2]=1, and EN [3]=1.

As a result, the memory element 52-0 is not updated, and holds a current value. On the other hand, the memory element 52-1 is updated with an insert entry, and other memory elements 52-2 and 52-3 are updated with data of the memory elements 52-1 and 52-2 in precedent stages, respectively.

In this way, the update control circuit 3 generates signals in which a value of a bit position specified by the position selection signal SEL and bit positions lower than the specified bit position are "1" as an enable signal EN.

Similarly, when the "insert/remove" signal is "0", the multiplexers 50-0, 56-1, 56-2 . . . do not select insert entries but select the outputs of memory elements in subsequent stages, as illustrated in FIG. 7. Therefore, as illustrated in FIG. 18, when the individual memory elements 52-0 to 52-N−1 selecting the outputs of memory elements in precedent stages which are output from the multiplexers 50-0, 54-1, and 54-2 are specified by the enable signal EN, the memory elements 52-0 to 52-3 store data output from the corresponding multiplexers 56-1 to 56-N−1, using the multiplexers 56-1, 56-2, and 56-3, specified by the position selection signal SEL.

In addition, at the time of data removal, the multiplexers 50-0, and 54-1 to 54-N−1 do not select insertion data. All position selection signals SEL input to the individual multiplexers 50-0, 54-1, and 54-2 to 54-N−1 are "0" in the example illustrated in FIG. 7. In other words, the position selection signals SEL become equivalent to a fixed value at the time of data removal, and hence it may be assumed that the multiplexers 50-0 and 54-1 to 54-N−1 do not practically operate. Accordingly, in the circuit illustrated in FIG. 18, components that correspond to the multiplexers 50-0, 54-1, and 54-2 to 54-N−1 are not illustrated.

For example, when data is removed from the memory element 52-1 in the circuit illustrated in FIG. 18, the update control circuit 3 generates an enable signal EN [3:0]=4 bits '1110', and outputs enable signals EN [0]=0, EN [1]=1, EN [2]=1, and EN [3]=1.

As a result, the memory element 52-0 is not updated but holds a current value. The memory elements 52-2 and 52-3 output data held therein to the corresponding memory elements 52-1 and 52-2 in precedent stages, respectively. The memory elements 52-1 and 52-2 are updated with the values of data output from the memory elements 52-2 and 52-3 in subsequent stages. The remove operation illustrated in FIG. 4 is executed. In this case, while the memory element 52-3 in the final stage becomes vacant, data to be inserted that is defined by a control interface may be additionally written at the same time. Alternatively, a circuit may be configured in which the number of entries is dynamically increased or decreased in such a way that the number of entries is counted and only entries within the current number of entries are validated.

In addition, when data is removed from another memory element, the same processing operation may be performed.

Figure 19:
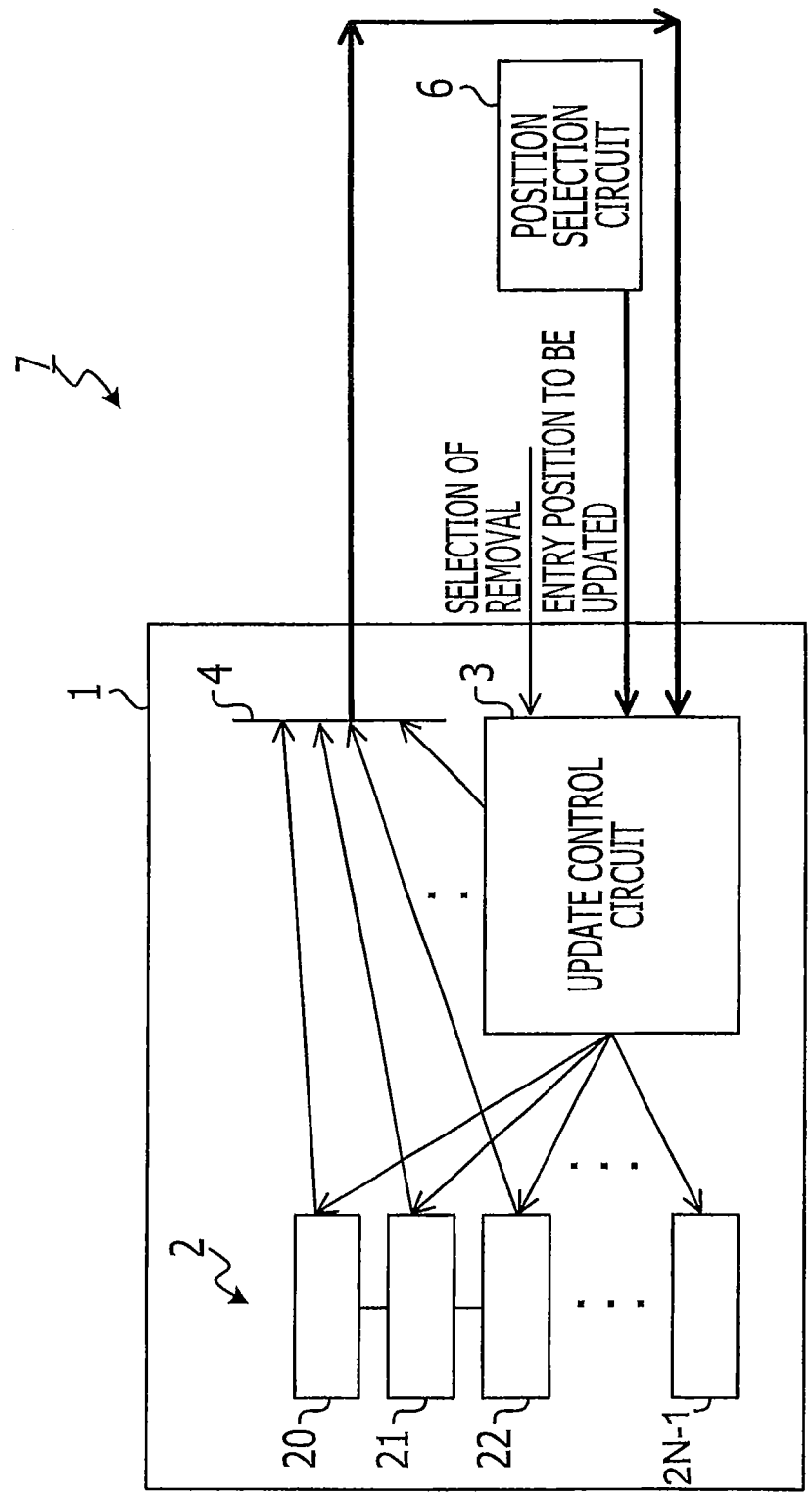
FIG. 19 is a block diagram of an LRU circuit that uses the list structure control circuit.
Figure 20:
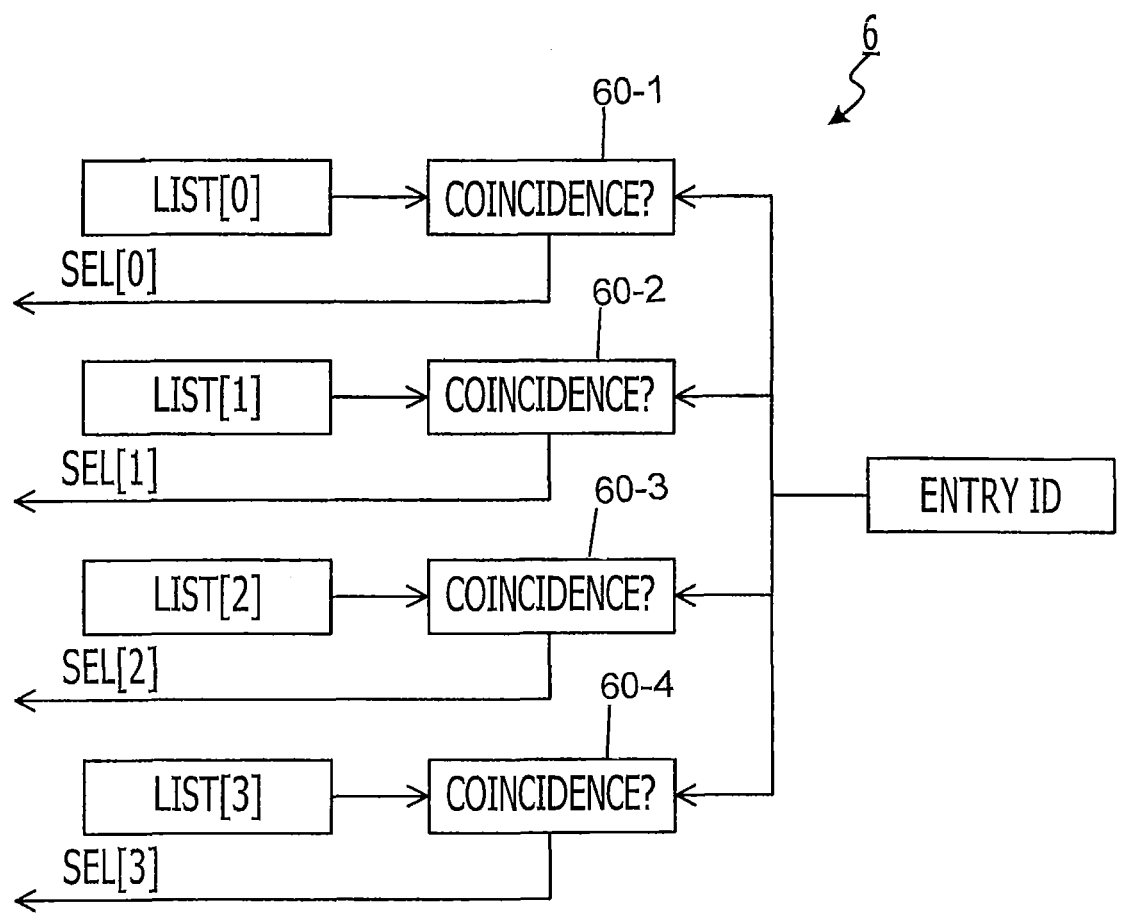
FIG. 20 is a block diagram of a position selection circuit.
Figure 22:
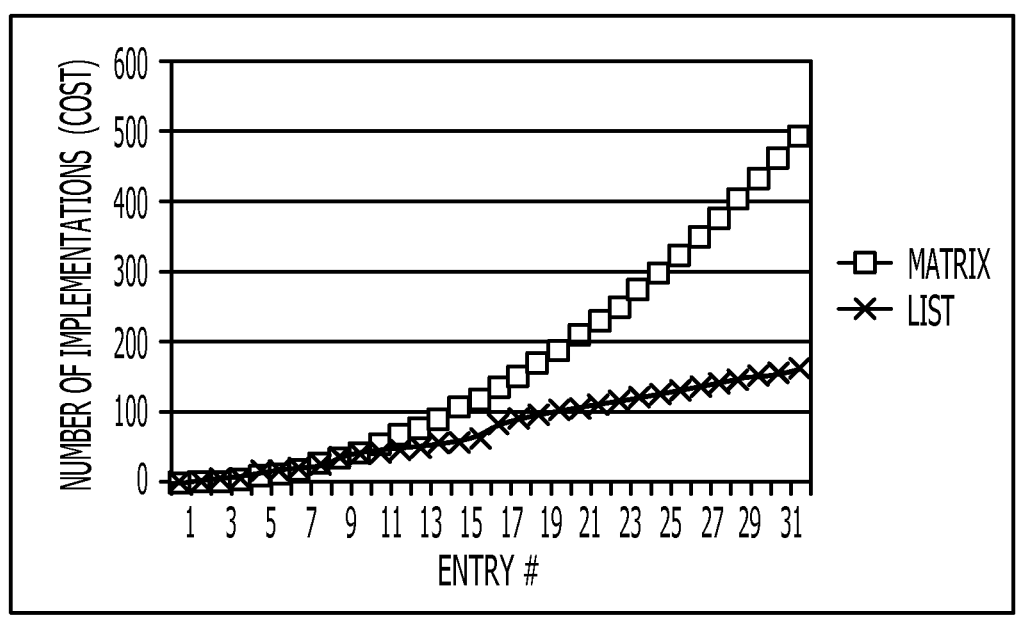
FIG. 22 is a diagram illustrating a comparison between hardware implementation costs of the LRU that uses the priority table and the present embodiment that uses the list.

FIG. 19 illustrates an example of an LRU circuit that uses the list structure control circuit described with reference to FIGS. 1 to 18. FIG. 20 illustrates a block diagram of a position selection circuit in FIG. 19, FIG. 21 illustrates a diagram of an LRU that uses a priority table as a comparative example. FIG. 22 is a diagram illustrating a comparison between hardware implementation costs of the LRU that uses the priority table and the embodiment that uses the list.

In FIG. 19, an LRU circuit 7 includes the list structure control circuit 1 described with reference to FIGS. 1 to 18 and a position selection circuit 6. The LRU stands for "Least Recently Used", and means a circuit used for selecting a least recently used entry. The list structure is suitable for implementing the circuit, and the top of the list becomes a least recently used entry by extracting a used entry from the list and adding the extracted entry to the end of the list, as described with reference to FIG. 5.

In FIG. 19, the same symbol is assigned to the same portion as that described with reference to FIGS. 1 to 18. In FIG. 19, the configuration and operation of the list structure control circuit 1 are the same as those described with reference to FIGS. 1 to 18. In this regard, however, as described with reference to FIG. 5, the list structure control circuit 1 performs a remove operation and an insertion operation for a removed entry. In addition, information managed by the LRU is managed using an entry number, and the entry number is data stored in the memory device network 2.

For example, when the memory device network 2 has 16 entries, 4-bit values of 4 bits '0000' to 4 bits '1111' are expressed as data for the entry numbers. 4 bits '0000' to 4 bits '1111' are sequentially stored as appropriate initial values for entry numbers in the memory device network 2. The initial values have no essential influence. Any sequence that is unique and has no overlap may be adopted.

Since the LRU is realized by arranging entries in the accessed order, an accessed entry is updated as a latest entry every time the entry is accessed. The term "access" used here does not mean a specific operation, but operations that correspond to the term "access" differ depending on objects for which the LRU is used.

For example, when the LRU is reconstructed on the condition that an entry 4 bits '0010' is a latest entry, the position selection circuit 6 instructs the update control circuit 3 about a position on the device network 2, in which the entry of 4 bits '0010' is stored, and instructs the update control circuit 3 to remove the entry (selection specification for REMOVE ordered: SELECTION OF REMOVAL and Position Selection Signal (SEL): ENTRY POSITION TO BE UPDATED). Based on the aforementioned remove operation, a selected entry is removed, and an entry number is output as removed data from the selection circuit 4. The output entry number is feedbacked, as input data, to the update control circuit 3. Accordingly, as described, the list structure control circuit 1 operates so as to additionally write the removed data to the end of the entry in the memory device network 2.

Since an operation as described above is performed, in the example illustrated in FIG. 19, an operation to remove and relocate a specified entry to the end of the list can be performed. Accordingly, the list may have a list structure in which an entry the final access for which is oldest is located on the top thereof and entries are arranged in chronological order. The top of the list is simply referred in order to obtain a least recently used entry, and the end of the list is simply referred in order to obtain a latest entry.

The position selection circuit 6 will be described with reference to FIG. 20. The position selection circuit 6 includes comparison circuits 60-1 to 60-4 that refer to data (LIST [0] to LIST [3]) stored in all memory elements in the memory device network 2, and perform a comparison between an entry number (ENTRY ID) to be updated and data stored in the memory elements. An entry in which its position is determined to coincide with the entry number in one of the comparison circuits 60-1 to 60-4 (COINCIDENCE?) turns out to be an entry to be removed, namely, an entry to be updated in FIG. 18, and a position selection signal (SEL [n]) is output from a corresponding comparison circuit.

The comparison circuits 60-1 to 60-3 may be provided in the list structure control circuit 1. In such a case, an entry position specification operation is not adopted but an entry value specification operation is adopted.

On the other hand, a control operation that using a priority table in known as an LRU method. FIG. 21 illustrates a diagram of an LRU that uses a priority table. As illustrated in FIG. 21, the priority table uses a matrix table that illustrates priority for four object entries A, B, C, and D. In FIG. 21, as illustrated with an inequality sign ">" or "<" in the matrix table, the priority of the entry A is higher than that of the entries B, C, and D, and the priority of the entry B is higher than that of the entry C and lower than that of the entry D. The priority of the entry C is lower than that of the entry D.

In a case in which the priority table is implemented, since a hardware cost proportional to the square of the number of entries is necessary, it has been thought to be difficult to implement the LRU that has a large number of entries. Therefore, it is necessary to alternatively use a circuit such as a pseudo LRU, which has a lower hardware cost but does not accurately perform the operation of the LRU.

When the priority table is used, priority information of $n*(n-1)/2$ bits is required for n entries. As illustrated in FIG. 21, in the priority table, a vertical axis and a horizontal axis are regarded as the left side and the right side of an inequality sign, respectively, and an inequality sign on the matrix indicates the priority of each of the combinations of components on the vertical axis and the horizontal axis. Since the diagonal elements of the matrix correspond to a comparison between the same component and the same component, it is not necessary to consider the diagonal elements. In addition, if the table is transposed, the way to use the table is the same (symmetry with respect to a diagonal line).

Therefore, the size of bits necessary for the priority table is expressed by the following expression.

$$\sum_{k=1}^{n-1} k = \frac{1+(n-1)}{2} \times (n-1) = \frac{n(n-1)}{2}$$

Each of the inequality signs "<" and ">" is implemented as a binary that arbitrarily indicates "0" or "1".

FIG. 22 illustrates the numbers of hardware implementation (circuit size=cost) of a method (Matrix) that uses the priority table and a method (List) that uses the list according to the embodiment. As illustrated in FIG. 22, the circuit size thereof is proportional to the square of the size of entries (ENTRY #) in the Matrix method that uses the priority table. On the other hand, the circuit scale of $n*\log^2 n$ can be achieved in the list method according to the embodiment. In addition, when the number of entries (ENTRY #) exceeds a double-digit value, it turns out that, compared with the Matrix method that uses the priority table, the list method according to the embodiment can be implemented with small-sized hardware.

Figure 23:
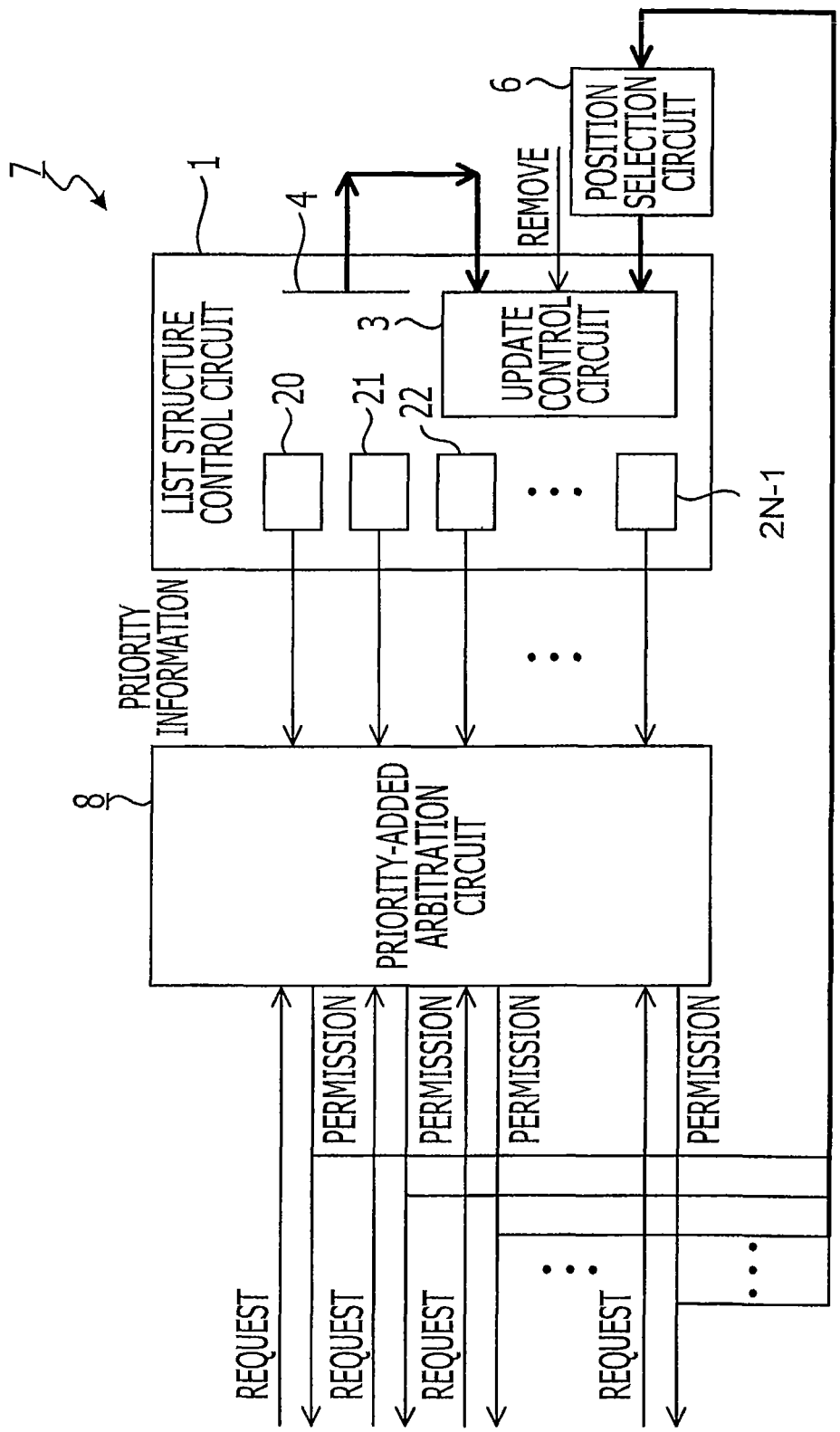
FIG. 23 is a diagram of an arbitration circuit to which the LRU circuit is applied.

FIG. 23 illustrates a block diagram of an arbitration circuit that uses the LRU circuit in FIGS. 19 and 20. In FIG. 23, the same symbol is assigned to the same portion as that described with reference to FIGS. 1 to 20. While the configurations and operations of the list structure control circuit 1 and the LRU circuit 7 are the same as those described with reference to FIGS. 1 to 20, the management number of a request source is used as the component of the LRU.

An arbitration circuit, for example, PRIORITY-ADDED ARBITRATION CIRCUIT 8, receives a plurality of requests and arbitrates the requests by referring the LRU circuit 7. When receiving the requests, the arbitration circuit 8 refers to management numbers (for example, PRIORITY INFORMATION) in the individual memory element of the memory network 2 in the LRU circuit 7, and assigns high priority to an entry beginning with a least recently used entry in chronological order to arbitrate the requests. In addition, when issuing permission based on the arbitration, the arbitration circuit 8 updates the LRU circuit 7 using the management number of a request source to which the permission is issued. The update operation is the same as that in the aforementioned example of the LRU circuit 7.

In this way, even if the number of request sources that participate in the arbitration is large, the arbitration circuit that uses the LRU can also be implemented in hardware.

Figure 24:
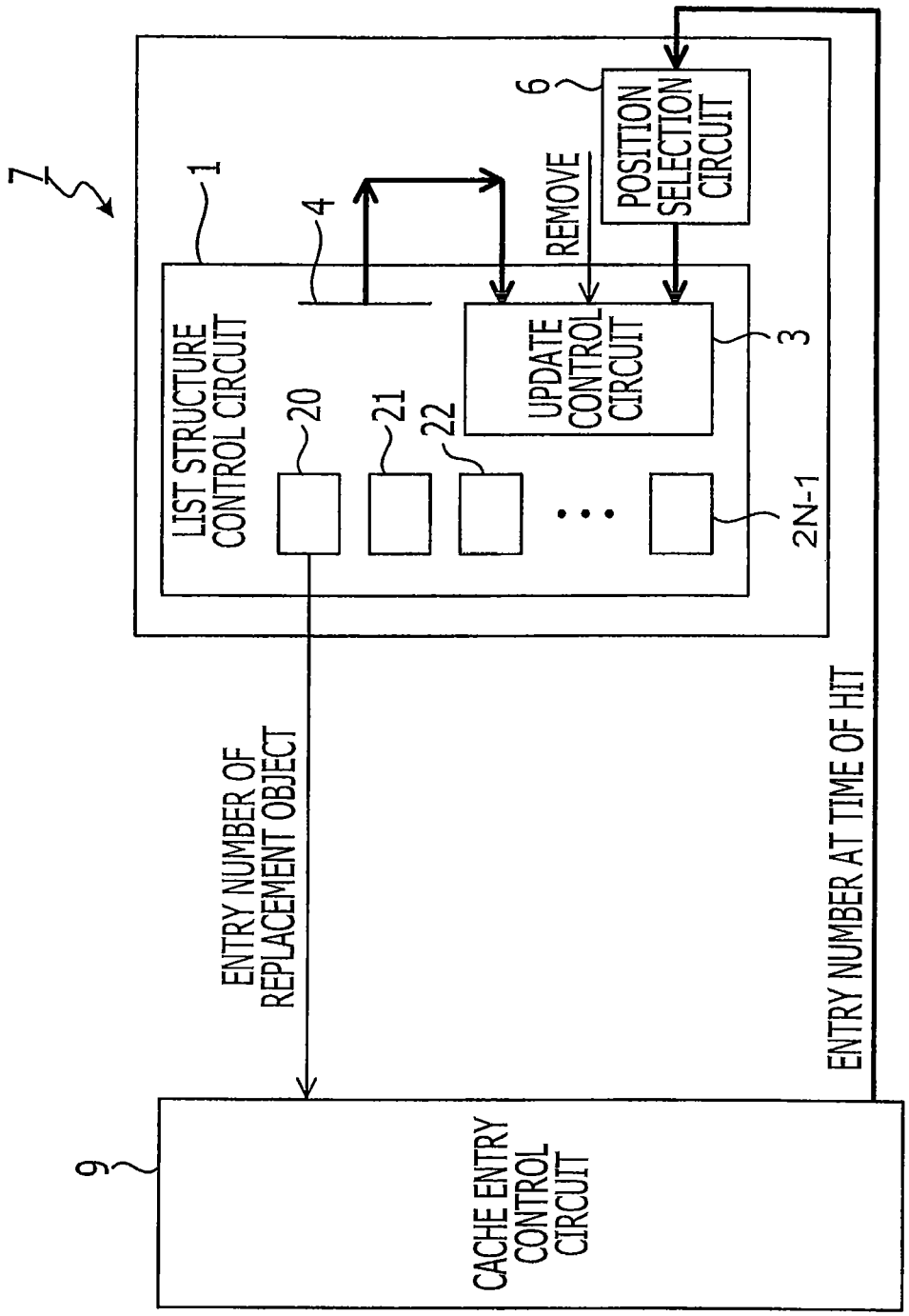
FIG. 24 is a diagram of a cache replacement circuit to which the LRU circuit is applied.
Figure 25:
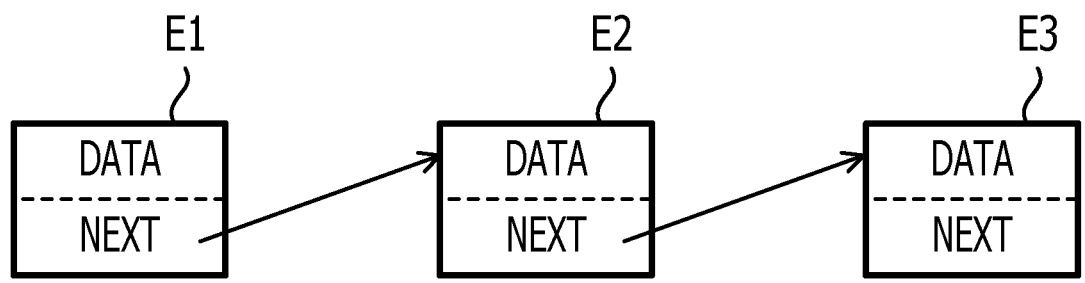
FIG. 25 is a diagram of a one-way link list based on software.
Figure 26:
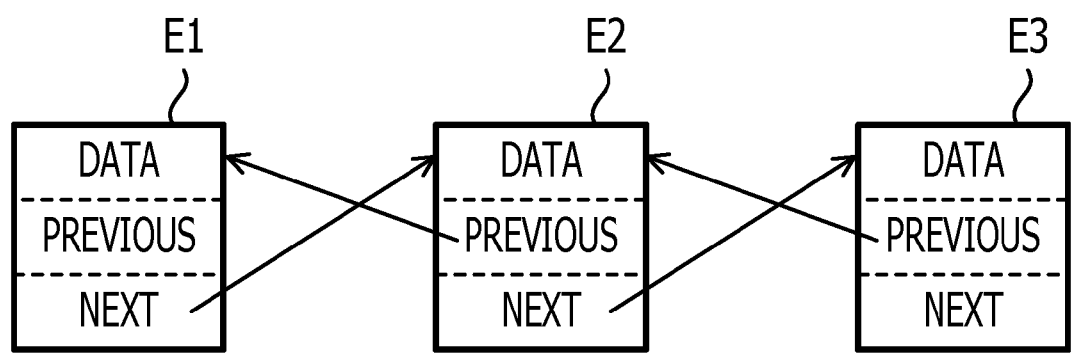
FIG. 26 is a diagram of a two-way link list based on software.
Figure 27:
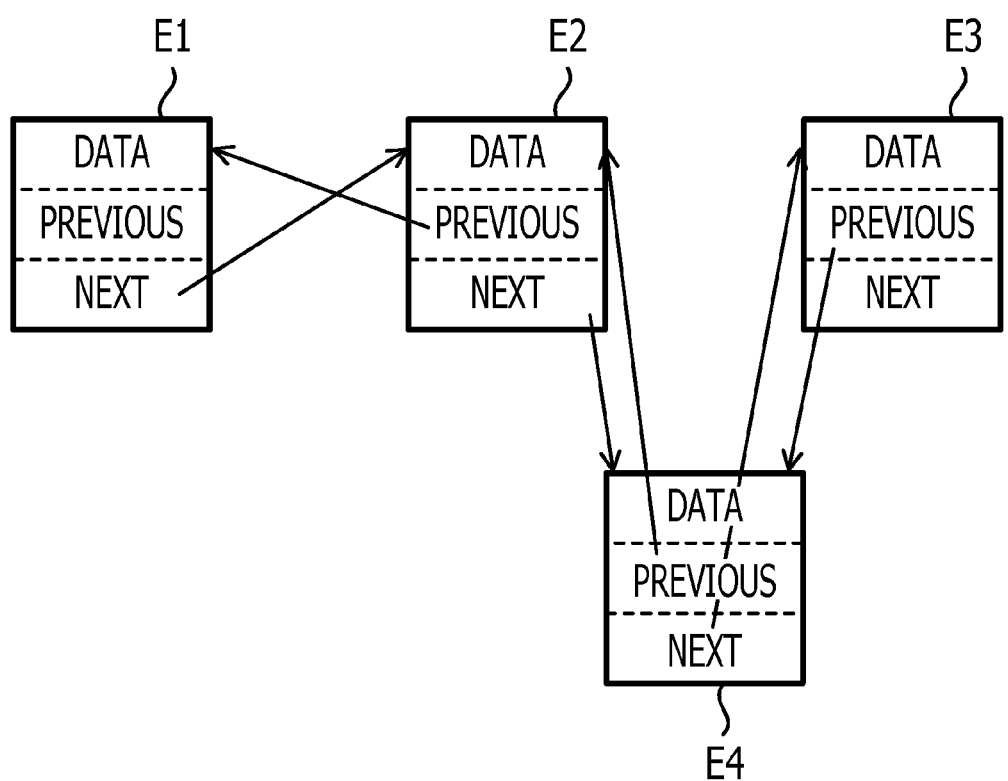
FIG. 27 is a diagram of an insert processing operation that uses the link list.
Figure 28:
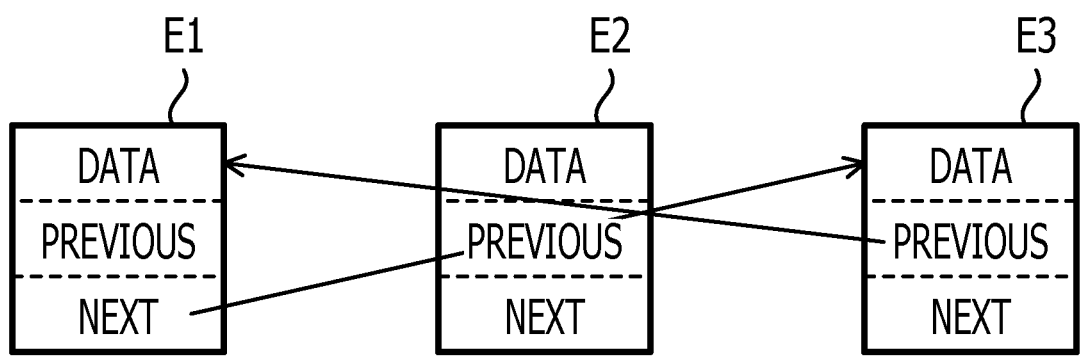
FIG. 28 is a diagram of a remove processing operation that uses the link list.

FIG. 24 illustrates a block diagram of a cache replacement circuit that uses the LRU circuit in FIGS. 19 and 20. In FIG. 24, the same symbol is assigned to the same portion as that described with reference to FIGS. 1 to 20. The configurations and operations of the list structure control circuit 1 and the LRU circuit 7 are the same as those described with reference to FIGS. 1 to 20.

A cache controller that determines the hit or the miss hit of a cache memory has a cache entry control circuit 9 that performs replacement of the cache memory. In the embodiment, the LRU circuit 7 in FIGS. 19 and 20 is used for cache replacement.

When a cache is hit, a cache entry control circuit 9 sends a corresponding entry number (ENTRY NUMBER AT TIME OF HIT) to the LRU circuit 7, and causes the LRU circuit 7 to update the cache. When a cache misshit occurs, the cache entry control circuit 9 selects as a replacement object a least recently used entry number in the LRU circuit 7 based upon an "ENTRY NUMBER OF REPLACEMENT OBJECT" signal received from the LRU circuit 7.

While the LRU circuit provides better performance in the cache replacement circuit, it is difficult to implement a large-sized LRU. It is necessary to realize, with a little ingenuity, a pseudo LRU circuit that uses a high-speed or small-sized circuit instead of accurately performing the operation of the LRU. Therefore, compared with the LRU circuit 7 of the embodiment, the performance deterioration of cache replacement is inevitable. According to the embodiment, an LRU that accurately operates for a large number of entries can also be provided.

While the memory network 2 has been described with reference to the circuit configuration in FIG. 7 in the aforementioned embodiment, another network configuration can also be applied to the memory network 2. In addition, while an example of a connection circuit that uses multiplexers has been described in the aforementioned embodiment, the connection circuit may also be configured using another circuit. Furthermore, a configuration including Adders and Subtractors that have other forms may also be applied to the update control circuit 3. According to an aspect of an embodiment, other arithmetic and/or logical operations can be performed with a fixed value, and/or for effecting simultaneous processing or enabling of an operation in relation to the memory device network.

According to the embodiment, a plurality of memory devices are series-connected through selection circuits, and data retention performed in the memory devices and/or data update performed in the memory devices using data of memory devices in the precedent stages are controlled on the basis of a calculation result obtained by adding a position selection signal, which specifies an insertion or removal position, and a fixed value, or by subtracting the position selection signal from the fixed value. Therefore, for a large-sized data structure that has an order relation, an operation for the insertion and the removal of data can be realized with hardware, and a high-speed and low-cost circuit can be provided. In addition, the implementation thereof can be performed following the large scale thereof.

According to an aspect of the embodiments of the invention, any combinations of one or more of the described features, functions, operations, and/or benefits can be provided. A combination can be one or a plurality. The embodiments can be implemented as a machine that includes computing hardware, such as (in a non-limiting example) hardware logic circuitry, and be included in or provided for any computer (computing apparatus) and/or computer system, including a super computer system, that can store, retrieve, process and/or output data and/or communicate (network) with other computers. According to an aspect of an embodiment, the described features, functions, operations, and/or benefits can be implemented by and/or use computing hardware and/or implemented in software. A computer can comprise a controller (CPU) (e.g., a hardware logic circuitry based computer processor that processes or executes instructions, namely software/program), computer readable media, transmission communication interface (network interface), and/or an output device, for example, a display device, all in communication through a data communication bus. In addition, a computer and/or memory can include one or more computers and/or memories in computer network communication with each other or other computers and/or memories. In addition, a computer processor and/or memory can include one or more computer processors and/or memories in one or more computers or any combinations of one or more computer processors, memories and/or computers. An aspect of an embodiment relates to causing one or more computers and/or computer processors to execute the described operations. The results produced can be output to an output device, for example, displayed on the display.

Any program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A list structure control circuit comprising:
    memory devices configured to individually store data and series connected as ordered stages so that data stored in each memory device has an order relation;
    selection circuits arranged for each memory device; and
    an update control circuit that is configure to:
        receive a position selection signal which specifies a position of a memory device from among the memory devices for at least one of data insertion or data removal,
        add the position selection signal to a fixed value, or subtract the position selection signal from a fixed value, and
        generate an enable signal based on the addition or the subtraction and controls data retention performed in the memory devices or data update performed in the memory devices using data of the memory devices in precedent stages based on the generated enable signal, wherein
    the selection circuits are controlled based on the position selection signal at a time of the data insertion, and data stored in a memory device located at the position specified by the position selection signal is updated with data to be inserted.

2. The list structure control circuit according to claim 1, wherein each selection circuit includes:
    a first selection circuit that selects one of data of a memory device located anterior to a memory device corresponding to the target selection circuit or data of a memory device located posterior to the corresponding memory device corresponding to the target selection circuit, in response to a data insertion signal; and
    a second selection circuit that selects one of an output from the first selection circuit or data input to the second selection circuit.

3. The list structure control circuit according to claim 1, wherein the update control circuit includes a carry select adder circuit configured to add the position selection signal to the fixed value or subtract the position selection signal from the fixed value.

4. The list structure control circuit according to claim 3, wherein the update control circuit further includes an inverting circuit configured to invert an output from the carry select adder circuit and output the enable signal.

5. The list structure control circuit according to claim 3, wherein
    the carry select adder circuit adds a value "1" to each bit in the position selection signal, and
    the update control circuit further includes an inverting circuit configured to invert an output from the carry select adder circuit and output the enable signal.

6. The list structure control circuit according to claim 3, wherein the carry select adder circuit subtracts a value "0" from each bit in the position selection signal.

7. The list structure control circuit according to claim 1, wherein each memory device comprises an update circuit configured to update data of the memory device based on the enable signal.

8. The list structure control circuit according to claim 7, wherein the update circuit includes an AND circuit configured to perform an operation of logical product of the enable signal and a clock, and input a clock to the memory device.

9. The list structure control circuit according to claim 7, wherein the update circuit includes a multiplexer configured to select and output one of an output from the memory device and the update data to the memory device.

10. The list structure control circuit according to claim 1, further comprising:
    a position selection circuit configured to compare individual entry numbers corresponding to data of the memory devices with a used entry number and output a position selection signal based upon the comparison to the update control circuit, wherein
    the update control circuit removes, in response to a data removal signal, data of a memory device corresponding to an entry number specified by the position selection signal, and inserts the removed data into a memory device in a final stage of the memory devices.

11. A computer system, comprising:

a list structure control circuit including:
- memory devices configured to individually store data and series connected as ordered stages so that data stored in each memory device has an order relation;
- selection circuits for each memory device; and
- an update control circuit that is capable to:
  - receive a position selection signal which specifies a position of a memory device from among the memory devices for data insertion and/or data removal,
  - add the position selection signal to a fixed value and/or subtract the position selection signal from a fixed value, and
  - generate an enable signal based on the addition and/or the subtraction and controls data retention performed in the memory devices or data update performed in the memory devices using data of the memory devices in precedent stages, based on the generated enable signal, wherein
- the selection circuits are controlled based on the position selection signal at a time of the data insertion, and data stored in a memory device located at the position specified by the position selection signal is updated with data to be inserted.

* * * * *